(12) United States Patent
Yokoyama et al.

(10) Patent No.: US 7,264,249 B2
(45) Date of Patent: Sep. 4, 2007

(54) SEAL

(75) Inventors: Keisuke Yokoyama, Kanagawa (JP);
Takahiko Uchiyama, Kanagawa (JP);
Toshikazu Yabe, Kanagawa (JP);
Toshimi Takajo, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/966,400

(22) Filed: Oct. 15, 2004

(65) Prior Publication Data
US 2005/0046115 A1 Mar. 3, 2005

Related U.S. Application Data

(63) Continuation of application No. 10/197,903, filed on Jul. 19, 2002.

(30) Foreign Application Priority Data

Jul. 23, 2001 (JP) .......................... P.2001-222179
Feb. 19, 2002 (JP) .......................... P.2002-042283
May 31, 2002 (JP) .......................... P.2002-160440

(51) Int. Cl.
*F16J 15/32* (2006.01)
*F16J 15/00* (2006.01)

(52) U.S. Cl. ...................... 277/549; 277/582
(58) Field of Classification Search ................ 277/549, 277/582
See application file for complete search history.

(56) References Cited

U.S. PATENT DOCUMENTS 2,731,060 A * 1/1956 Rowe .................... 152/524
3,785,856 A * 1/1974 Gotoh ......................... 277/571
4,199,159 A * 4/1980 Evans .......................... 277/636
4,228,881 A 10/1980 Nakamura (Continued)

FOREIGN PATENT DOCUMENTS

JP 6-1893 1/1994

(Continued)

OTHER PUBLICATIONS

Akio Nitanai, et al., "On the Following Property of the Oil Seal Lip", *Journal of Japan Society of Lubrication Engineers*, vol. 29, No. 5, pp. 363-366, 1984.

*Primary Examiner*—Carlos Lugo
(74) *Attorney, Agent, or Firm*—Sughrue Mion, PLLC

(57) ABSTRACT

A hub unit including a hub and a flange integrally formed with the hub, and a seal including a core metal and an elastic body integrally molded with the core metal. The elastic body includes one or more lips in sliding contact with one or both of the hub and the flange. The elastic body includes a molded rubber, wherein the molded rubber contains, as a raw rubber, acrylonitrile/butadiene rubber having an acrylonitrile monomer content of from 26 to 36% by weight. In a first embodiment, the hub unit includes a hub adapted for receiving a shaft and a flange integrally formed with the hub, and the seal is attached to an outer circumference of the hub unit. In a second embodiment, the hub unit includes an inner ring having a raceway surface for receiving rolling elements and an outer ring. The seal seals the space between the inner ring and the outer ring. Furthermore, the seal includes a radial lip in sliding contact with an outer circumferential surface of the hub.

12 Claims, 13 Drawing Sheets

U.S. PATENT DOCUMENTS

| | | | |
|---|---|---|---|
| 4,443,019 A * | 4/1984 | Ishido et al. | 277/652 |
| 4,449,713 A * | 5/1984 | Ishido et al. | 277/312 |
| 4,822,654 A * | 4/1989 | Takemura et al. | 428/36.8 |
| 4,988,548 A * | 1/1991 | Takemura et al. | 428/36.8 |
| 5,093,426 A * | 3/1992 | Sakabe et al. | 525/223 |
| 5,147,702 A | 9/1992 | Aoyagi | |
| 5,282,689 A | 2/1994 | Imamura et al. | |
| 5,383,728 A | 1/1995 | Micca et al. | |
| 5,510,191 A * | 4/1996 | Higashira et al. | 428/457 |
| 5,695,198 A | 12/1997 | Iwamoto et al. | |
| 5,716,277 A * | 2/1998 | Reynolds | 464/131 |
| 5,975,534 A * | 11/1999 | Tajima et al. | 277/353 |
| 6,003,876 A * | 12/1999 | Yamagishi et al. | 277/407 |
| 6,028,137 A | 2/2000 | Mahmud et al. | |
| 6,059,663 A * | 5/2000 | Jones et al. | 464/133 |
| 6,428,649 B1 * | 8/2002 | Gopalan | 156/244.24 |
| 6,448,309 B2 | 9/2002 | Mahmud et al. | |
| 6,525,105 B1 | 2/2003 | Udagawa et al. | |
| 6,572,269 B2 | 6/2003 | Yabe et al. | |
| 6,592,264 B2 | 7/2003 | Yabe et al. | |
| 6,688,605 B1 * | 2/2004 | Yano et al. | 277/566 |

FOREIGN PATENT DOCUMENTS

| | | |
|---|---|---|
| JP | 2000-52369 | 2/2000 |

* cited by examiner

SEAL

CROSS REFERENCE TO RELATED APPLICATION

This application is a continuation of application Ser. No. 10/197,903 filed Jul. 19, 2002, incorporated herein by reference.

FIELD OF THE INVENTION

The present invention relates to a seal for use in rolling apparatuses such as rolling bearings, automotive hub units, hub unit bearings, linear guides, and ball screws. More particularly, the invention relates to a seal suitable for use in rolling apparatuses lubricated with a grease and used in a severe environment in which water and dust are present in large amounts.

BACKGROUND OF THE INVENTION

In rolling bearings, seals have often been disposed between the outer ring and the inner ring for the purposes of preventing the grease present around the rolling elements and the dust generated during use from leaking out and of preventing external suspended dust particles from coming into the part where the rolling elements are disposed. An example of such sealed rolling bearings is shown in FIG. 1.

The rolling bearing shown in FIG. 1 is a sealed bearing having a seal on each side. This seal 1 is constituted of a ring-form core metal 2 having a hook part along the outer edge and, disposed on the outer side of the core metal 2, an elastic body 3 formed by molding and vulcanizing a synthetic rubber integrally with the core metal. When viewed from the standpoint of functions, this seal is divided into: a ring-form main part 11 composed of the core metal excluding its hook part and that part of the elastic body which is located on the outer side of that part of the core metal; a caulking part 12 which is composed of the hook part of the core metal and that part of the elastic body which is located outside the hook part, the caulking part 12 being fitted into a fixing groove 41 formed in the inner circumferential surface of the outer ring 4; and a lip 13 consisting of that part of the elastic body which is located on the inner circumferential side of the core metal, the lip 13 being brought into sliding contact with a receiving groove 51 formed in the outer circumferential surface of the inner ring 5.

The caulking part 12 is elastically deformed and forced into the fixing groove 41 in the inner circumferential surface of the outer ring while keeping the lip 13 in contact with the receiving groove 51 in the outer circumferential surface of the inner ring. Thus, the seal 1 is fitted into the space between the outer ring 4 and inner ring 5 of the rolling bearing.

On the other hand, as shown in FIG. 3, an automotive hub unit 6 also has a seal 10 attached to the outer circumference thereof. This seal 10 also is composed of a core metal 20 and an elastic body 30 constituted of a molded rubber material. This hub unit 6 comprises a hub 61 into which a shaft is to be disposed and a flange 62 integrally formed with the hub 61. The seal 10 has two lips 31 and 32 to be in sliding contact with the hub 61 and one lip 33 to be in sliding contact with the flange 62.

There also is a hub unit bearing which comprises a hub 61, a flange 62, and interposed therebetween a hub shaft part for shaft fitting therein, and in which the outer circumferential surface of the hub shaft part has an inner raceway for a rolling bearing. A seal has been attached also to this type of hub unit bearing.

An example of still another type of seal is shown in FIG. 5. This seal 100 also is composed of a core metal 200 and an elastic body 300 constituted of a molded rubber material. This seal 100 serves to seal the space between a member 50 corresponding to an inner ring and having a raceway surface for rolling elements 70 and a member 40 corresponding to an outer ring. The member 50 corresponding to an inner ring comprises a hub part 50a and a flange part 50b. This seal 100 has a radial seal lip 301, which is brought into sliding contact with the outer circumferential surface of the hub part 50a, and two side seal lips 302 and 303, which are brought into sliding contact with the flange surface of the flange part 50b.

The materials of those seals are generally as follows. The core metals are plates of a steel such as SPCC or SECC. The elastic bodies constituting the lips and other parts are synthetic rubbers such as nitrile rubbers, acrylic rubbers, silicone rubbers, and fluororubbers.

In the case where such rolling bearings and automotive hub units are used in a severe environment in which water and dust are present in large amounts, the following trouble may arise. During continuous use, the lip of the seal comes to have reduced elasticity or breaks, and the force of sliding contact of the lip with the seal contact surface (that surface of the mating member which is in contact with the lip of the seal) decreases accordingly to form a minute gap between the lip and the seal contact surface. Water and dust particles then come into the bearing through the gap. As a result, the grease deteriorates and this may lead to a shortened life of the bearing.

SUMMARY OF THE INVENTION

The invention has been achieved in view of the problem of the related art described above. An aim of the invention is to provide a seal which is for use in rolling apparatuses such as rolling bearings, automotive hub units, hub unit bearings, linear guides, and ball screws, and which has one or more lips retaining the state of being in highly satisfactory sliding contact with seal contact surfaces.

In order to eliminate the problem described above, the invention provides a seal having one or more lips constituted of a molded rubber, the molded rubber having a maximum value of loss tangent (tan $\delta$) of 0.50 or smaller in the temperature range of from 10 to 120° C.

The invention further provides a seal having one or more lips constituted of a molded rubber, the molded rubber having a maximum value of loss tangent (tan $\delta$) of 0.40 or smaller in the temperature range of from 20 to 70° C.

DESCRIPTION OF THE REFERENCE NUMERALS AND SIGNS

Figure 1:
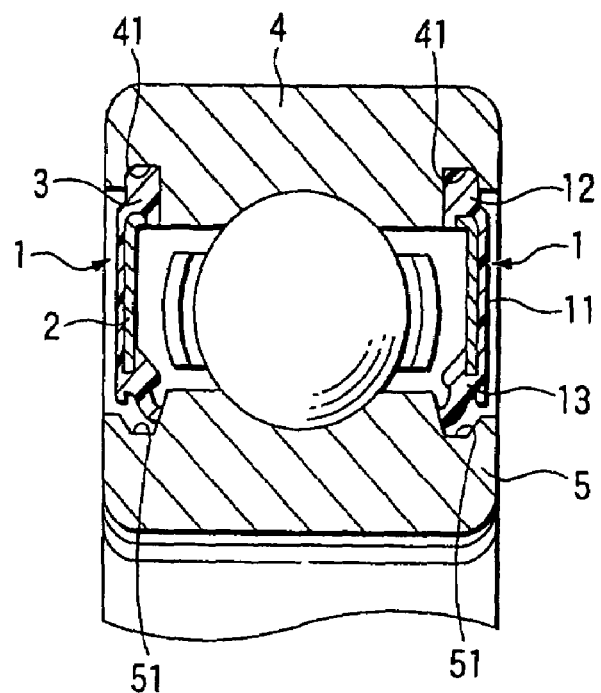
FIG. 1 is a sectional view illustrating an example of sealed rolling bearings.

| | |
|---|---|
| 1 | seal |
| 10 | seal |
| 11 | main part |
| 12 | caulking part |
| 13 | lip |
| 2 | core metal |
| 20 | core metal |
| 3 | elastic body |
| 30 | elastic body |
| 31 | lip |
| 32 | lip (main lip) |
| 33 | lip |
| 33b | lip |
| 4 | outer ring |
| 40 | member corresponding to outer ring |
| 41 | fixing groove |
| 5 | inner ring |
| 50 | member corresponding to inner ring |
| 50a | hub part |
| 50b | flange part |
| 51 | receiving groove |
| 6 | hub unit |
| 61 | hub |
| 62 | flange |
| 70 | rolling element |
| 100 | seal |
| 200 | core metal |
| 300 | elastic body |
| 301 | radial seal lip |
| 302 | side seal lip |
| 303 | side seal lip |

DETAILED DESCRIPTION OF THE INVENTION

When a sinusoidal stress is imposed on a viscoelastic body and this causes a sinusoidal strain therein, the strain occurs after a delay from the stress imposition. The angle of this phase delay of strain from stress imposition is referred to as loss angle (δ). Loss tangent (tan δ) is the tangent of this loss angle (δ), and is a measure of the amount of energy which dissipates as heat during the deformation. The value of loss tangent (tan δ) of a molded rubber is determined through a kinematic viscoelasticity test in which a sinusoidally oscillatory load is imposed on the molded rubber in accordance with JIS K7244-4.

In the invention, the term "maximum value of loss tangent (tan δ) in the temperature range of from 10 to 120° C." means the maximum value of loss tangent (tan δ) as obtained in a kinematic viscoelasticity test in which a sinusoidally oscillatory load is imposed in an atmosphere whose temperature ranges from 10 to 120° C. The term "maximum value of loss tangent (tan δ) in the temperature range of from 20 to 70° C." means the maximum value of loss tangent (tan δ) as obtained in a kinematic viscoelasticity test in which a sinusoidally oscillatory load is imposed in an atmosphere whose temperature ranges from 20 to 70° C.

Usually, rolling apparatuses are mostly used in the temperature range of about from room temperature to 120° C. Automotive hub units also heat up to about 10° C. upon engine starting and work at temperatures not higher than 120° C. Consequently, in the seal of the invention in which the molded rubber constituting the lips has been regulated so as to have a maximum value of loss tangent (tan δ) of from 0.08 to 0.50 in the temperature range of from 10 to 120° C., the sliding contact of the lips with the seal contact surfaces is retained in the range of ordinary use temperatures for rolling apparatuses.

In the case where the seal is to be applied to a rolling apparatus used at temperatures in the range of from 20 to 70° C., the molded rubber constituting the lips is one which has been regulated so as to have a maximum value of loss tangent (tan δ) of from 0.08 to 0.40 in the temperature range of from 20 to 70° C. Due to this constitution, the sliding contact of the lips with the seal contact surfaces is retained in this range of use temperatures (from 20 to 70° C.).

In the seal of the invention for rolling appartuses, the lips preferably have a hardness, as measured with the spring hardness scale A provided for in JIS K6301, in the range of from 50 to 90. When the lips of the seal have a hardness within this range, they show satisfactory sealing properties.

In case where the hardness of the lips is lower than 50, the lips suffer an excessive deformation during seal rotation and this tends to result in heat generation in the lips and an increase in torque. As a result, the rolling apparatus may come to have increased frictional resistance during operation, making it difficult to perform a smooth rotational movement. In case where the hardness thereof exceeds 90, the lips have reduced rubber elasticity and the force of sliding contact of the lips with the seal contact surfaces becomes insufficient, resulting in insufficient sealing properties. The especially preferred range of the hardness of the lips as measured with the spring hardness scale A is from 70 to 80.

The molded rubber having a maximum value of loss tangent (tan δ) of 0.50 or smaller in the temperature range of from 10 to 120° C. and the molded rubber having a maximum value of loss tangent (tan δ) of 0.40 or smaller in the temperature range of from 20 to 70° C. are obtained by suitably incorporating compounding ingredients such as, e.g., a vulcanizing agent, vulcanization accelerator, vulcanization accelerator aid, antioxidant, reinforcement, plasticizer, and coupling agent into a raw rubber according to need and vulcanizing and molding the resultant rubber composition.

Ingredients such as a reinforcing filler, processing aid, wear resistance improver, lubricating oil, and lubricant can be further added to the rubber composition according to need. By regulating the amounts of ingredients such as a reinforcing filler and a wear resistance improver to be added to the rubber composition, a molded rubber having a given hardness can be obtained.

Specific examples of each component of the rubber composition are shown below.

As the raw rubber can be used NR (natural rubber), IR (isoprene rubber), SBR (styrene/butadiene rubber), BR (butadiene rubber), CR (chloroprene rubber), NBR (acrylonitrile/butadiene rubber), IIR (butyl rubber), EPDM (ethylene/propylene rubber), urethane rubber, silicone rubber, fluororubber, acrylic rubber, or the like.

The nitrile rubber is available in various grades according to acrylonitrile content. Examples thereof include low-nitrile NBR, medium-nitrile NBR, medium-to-high-nitrile NBR, high-nitrile NBR, and ultrahigh-nitrile NBR. Especially preferred of these is medium-to-high-nitrile NBR from the standpoints of sliding-contact properties, wear resistance, heat resistance, and cold resistance. Also usable is a nitrile rubber with which a polymer having amino or phenyl groups has been copolymerized and which has higher heat resistance. A carboxyl-modified nitrile rubber having higher wear resistance may also be used.

Examples of the vulcanizing agent (crosslinking agent) include (1) various sulfurs such as powdery sulfur, sulfur flower, precipitated sulfur, and highly dispersible sulfur, (2) sulfur compounds capable of releasing sulfur, such as morpholine disulfide, alkylphenol disulfides, and N,N-dithiobis (hexahydro-2H-azepinone-2)thiuram polysulfide, and (3) peroxides such as dicumyl peroxide, di(t-butylperoxy)diisopropylbenzene, and benzoyl peroxide. Preferred of these are highly dispersible sulfur and morpholine disulfide from the standpoints of dispersibility, ease of handling, and heat resistance. The amount of the vulcanizing agent is generally from 0.1 to 5.0 parts by weight per 100 parts by weight of the raw rubber.

In the case where a sulfur or sulfur compound vulcanizing agent is used, it is necessary to use as a vulcanization accelerator one or more members selected from guanidine compounds, aldehyde-ammonia systems, thiazole compounds, sulfenamide compounds, thiourea compounds, thiuram compounds, dithiocarbamate compounds, xanthate compounds, and the like. When highly dispersible sulfur is incorporated in a small amount, it is preferred to use a thiuram compound such as tetramethylthiuram disulfide or a sulfenamide compound such as N-cyclobenzyl-2-benzothiazyl sulfenamide in combination with a thiazole compound such as 2-mercaptobenzothiazole. The amount of the vulcanization accelerator is generally from 0.1 to 5.0 parts by weight per 100 parts by weight of the raw rubber.

Examples of the vulcanization accelerator aid include metal oxides such as zinc oxide, metal carbonates, metal hydroxides, fatty acids such as stearic acid and derivatives of the acids, and amines. In the case where a carboxyl-modified nitrile rubber is used as a raw rubber, use of zinc oxide is apt to cause prevulcanization. In this case, it is preferred to use a combination of zinc peroxide and stearic acid. Zinc peroxide undergoes no chemical change at the temperature used for the kneading for rubber composition preparation, remains as it is in the rubber composition, and generates zinc oxide during vulcanization and molding. Consequently, the use of zinc peroxide does not cause prevulcanization during kneading or storage. The amount of the vulcanization accelerator aid is generally from 0.1 to 10.0 parts by weight per 100 parts by weight of the raw rubber.

Examples of the antioxidant for use in preventing oxidative deterioration include amine-ketone condensates, aromatic secondary amines, monophenol derivatives, bis- or polyphenol derivatives, hydroquinone derivatives, sulfur compound antioxidants, and phosphorus compound antioxidants. Preferred of these are amine-ketone condensates such as a condensate of a 2,2,4-trimethyl-1,2-dihydroquinoline polymer or diphenylamine with acetone and aromatic secondary amines such as N,N'-di-β-naphthyl-p-phenylenediamine, 4,4'-bis (α,α-dimethylbenzyl)diphenylamine, and N-phenyl-N'-(3-methacryloyloxy-2-hydroxypropyl)-p-phenylenediamine. The amount of the antioxidant is generally from 1.0 to 5.0 parts by weight per 100 parts by weight of the raw rubber.

For the purpose of preventing pyrolysis and improving heat resistance, it is more preferred to use the antioxidant in combination with a secondary antioxidant. Examples of the secondary antioxidant include sulfur compounds such as 2-mercaptobenzimidazole and 2-mercaptomethylbenzimidazole and the zinc salts thereof. The amount of the secondary antioxidant is generally from 1.0 to 5.0 parts by weight per 100 parts by weight of the raw rubber.

A wax having a melting point of about from 55 to 70° C. may be added as a sun-cracking inhibitor for inhibiting the cracking caused by the action of sunlight or ozone, in an amount of about from 0.5 to 2.0 parts by weight per 100 parts by weight of the raw rubber. In case where the amount of the wax added is less than 0.5 parts, this addition produces almost no effect in preventing the cracking caused by the action of ozone. In case where the amount thereof exceeds 2 parts by weight, the excess wax bleeds out from the rubber to pose a problem concerning processability.

In the case where a further improvement in moldability is necessary, a plasticizer is suitably added as a processing aid. There is no need of adding a processing aid as long as processability is satisfactory. When a plasticizer is added, the amount thereof is generally from 3 to 20 parts by weight per 100 parts by weight of the raw rubber. In case where the plasticizer is added in too large an amount, not only a soft rubber composition is obtained but also there is the possibility that the plasticizer might remain in an incompletely mixed state and bleed out.

Examples of the plasticizer include phthalic acid derivatives such as di(2-ethylhexyl) phthalate, isophthalic acid derivatives, tetrahydrophthalic acid derivatives, adipic acid derivatives, azelaic acid derivatives, sebacic acid derivatives, dodecanoic acid derivatives, maleic acid derivatives, fumaric acid derivatives, trimellitic acid derivatives, pyromellitic acid derivatives, citric acid derivatives, itaconic acid derivatives, oleic acid derivatives, ricinoleic acid derivatives, stearic acid derivatives, phosphoric acid derivatives, glutaric acid derivatives, glycolic acid derivatives, glycerol derivatives, paraffin derivatives, epoxy derivatives, polyester type plasticizers, polyether type plasticizers, and liquid rubbers.

Examples of the coupling agent include silane, aluminum compound, and titanate coupling agents. Specific examples thereof include γ-mercaptopropyltrimethoxysilane, γ-glycidoxypropyltrimethoxysilane, and γ-methacryloxypropyl-trimethoxysilane. The amount of the coupling agent is generally from 0.1 to 5.0 parts by weight per 100 parts by weight of the raw rubber.

Examples of the reinforcing filler include carbon blacks and white fillers. Specific examples of the carbon blacks include ISAF (Intermediate Super Abrasion Furnace black), MAF (Medium Abrasion Furnace black), SRF (Semi-Reinforcing Furnace black), GPF (General Purpose Furnace black), FT (Fine Thermal Furnace black), MT (Medium Thermal Furnace black), HAF (High Abrasion Furnace black), and FEF (Fast Extruding Furnace black). Preferred of these are HAF, FEF, and SRF from the standpoints of reinforcing properties and conformability.

Examples of the white fillers include various silicas, basic magnesium carbonate, activated calcium carbonate, special calcium carbonate, ultrafine magnesium silicate, clay, talc, diatomaceous earth, and wollastonite. A reinforcing filler comprising a mixture of a carbon black and a white filler may be used.

Use of a rubber composition containing a reinforcing filler gives lips having enhanced wear resistance. As a result, the lips of the seal have improved sealing properties. The amounts of reinforcing fillers to be added are as follows. In the case of carbon blacks, the amount thereof is generally from 20 to 90 parts by weight per 100 parts by weight of the raw rubber. In case where a carbon black is added in an amount smaller than 20 parts by weight, sufficient reinforcing properties are not obtained. In case where a carbon black is added in an amount exceeding 90 parts by weight, the resultant molded rubber has an increased hardness and a reduced elongation and the inherent rubber elasticity is impaired.

When a white reinforcement is added as a reinforcing filler, the amount thereof is generally from 20 to 150 parts by weight per 100 parts by weight of the raw rubber. In case where the amount of the reinforcing filler added is smaller than 20 parts by weight, sufficient reinforcing properties are not obtained. In case where the amount thereof exceeds 150 parts by weight, the resultant molded rubber has an increased hardness and a reduced elongation and the inherent rubber elasticity is impaired.

When a mixture of a carbon black and a white reinforcement is used as a reinforcing filler, the amounts of the carbon black and white reinforcement are generally from 10 to 90 parts by weight and from 10 to 110 parts by weight, respectively, and the total amount of the two reinforcing ingredients contained is generally from 20 to 200 parts by weight, per 100 parts by weight of the raw rubber. In case where the total amount of the reinforcing filler contained is smaller than 20 parts by weight, sufficient reinforcing properties are not obtained. In case where the total amount thereof exceeds 200 parts by weight, the resultant molded rubber has an increased hardness and a reduced elongation and the inherent rubber elasticity is impaired.

Examples of the wear resistance improver include polyolefin particles and fine spherical carbon particles. Specific examples of the polyolefin particles include particles made of polyethylene or polypropylene, preferably particles of a carboxyl-modified polyethylene (polyethylene modified with maleic anhydride) and particles of a carboxyl-modified polypropylene (polypropylene modified with maleic anhydride).

Upon carboxyl modification, polyethylene and polypropylene become apt to adhere to various rubbers, oxides, and other materials due to the carboxyl groups incorporated into the structure. When a carboxyl-modified nitrile rubber is used as a raw rubber, the carboxyl groups present in the rubber produce the same effect. Consequently, such a wear resistance improver (i.e., the modified polyethylene or polypropylene particles) and the modified nitrile rubber, when used in combination, are thought to produce a synergistic effect to further improve mechanical strengths such as tensile strength, wear resistance, and resistance to fatigue from flexing.

The amount of the polyolefin particles to be added is preferably regulated to 10 to 60 parts by weight per 100 parts by weight of the raw rubber from the standpoint of balancing the wear resistance of the molded rubber with other properties thereof. In case where the amount of the polyolefin particles added is smaller than 10 parts by weight, the effect of improving wear resistance is low. Conversely, amounts thereof exceeding 60 parts by weight result in a molded rubber having an increased hardness, a reduced elongation, and impaired rubber elasticity.

Examples of the lubricating oil include ether oils, silicone oils, poly($\alpha$-olefin) oils, fluorine-contained oils, and fluoroine-contained surfactants. Preferred of these are silicone oils, in particular, modified silicone oils having functional groups. It is thought that these functional groups react with the main chain of the rubber and thereby enable the oil to bleed out from the molded rubber not at a time but gradually over a prolonged time period. Since the lubricating oil is liquid, it is apt to bleed out from the molded rubber and is hence effective even when added in a small amount.

The amount of the lubricating oil to be added is generally from 2 to 30 parts by weight per 100 parts by weight of the raw rubber. The incorporation thereof improves the lubricity of the molded rubber. In case where the amount of the lubricating oil added is smaller than 2 parts by weight, sufficient lubricity is not imparted. On the other hand, amounts thereof exceeding 30 parts by weight are undesirable in that failures in dispersing additives may occur during rubber processing.

Modes for carrying out the invention will be explained below.

The following were prepared as materials for rubber compositions.

Raw rubber A: medium-to-high-nitrile NBR ("JSR NBR N230S" manufactured by JSR Corp.); acrylonitrile monomer content, 35%

Raw rubber B: carboxylated medium-to-high-nitrile NBR ("Nipol DN631" manufactured by Nippon Zeon Co., Ltd.); acrylonitrile monomer content, 33.5%

Raw rubber C: high-nitrile NBR ("JSR NBR N222S" manufactured by JSR Corp.); acrylonitrile monomer content, 43%

Raw rubber D: medium-nitrile NBR ("JSR NBR N241S" manufactured by JSR Corp.); acrylonitrile monomer content, 29%

Raw rubber E: medium-nitrile NBR ("JSR NBR N240S" manufactured by JSR Corp.); acrylonitrile monomer content, 26%

Raw rubber F: medium-nitrile NBR ("Nipol DN2850" manufactured by Nippon Zeon Co., Ltd.); acrylonitrile monomer content, 28%

Raw rubber G: medium-nitrile NBR ("Nipol DN3350" manufactured by Nippon Zeon Co., Ltd.); acrylonitrile monomer content, 33%

Raw rubber H: high-nitrile NBR ("JSR NBR N235S" manufactured by JSR Corp.); acrylonitrile monomer content, 36%

Raw rubber I: high-nitrile NBR ("JSR NBR N220S" manufactured by JSR Corp.); acrylonitrile monomer content, 41%

Carbon black A: HAF ("Diablack H" manufactured by Mitsubishi Chemical Corp.)

Carbon black B: SRF ("Seast S" manufactured by Tokai Carbon Co., Ltd.)

Silica: hydrated silica ("Nipsil AQ" manufactured by Nippon Silica Industrial Co., Ltd.)

Silane-modified clay: "ST-301" manufactured by Shiraish Calcium Kaisha, Ltd.

Burned clay: "SATINTONE No. 0.5" manufactured by Tsuchiya Kaolin Ind., Ltd.

Talc: "MP10-52" manufactured by Pfizer Inc.

Wollastonite: "NYAD10" manufactured by NYCO Inc.

Vulcanizing agent: highly dispersible sulfur ("Sulfalx PMC" manufactured by Tsurumi Kagaku Kogyo K.K.)

Vulcanization accelerator A: tetramethylthiuram disulfide ("Accel TMT" manufactured by Kawaguchi Chemical Industry Co., Ltd.)

Vulcanization accelerator B: tetraethylthiuram disulfide ("Nocceler TET" manufactured by Ouchi-Shinko Chemical Industrial Co., Ltd.)

Vulcanization accelerator C: N-cyclohexyl-2-benzothiazyl sulfenamide ("Accel CZ-R" manufactured by Kawaguchi Chemical Industry Co., Ltd.)

Vulcanization accelerator aid A (serving also as lubricant): stearic acid ("Lunac S-35" manufactured by Kao Corp.)

Vulcanization accelerator aid B: zinc oxide ("France No. 1" manufactured by Sakai Chemical Industry Co., Ltd.)

Vulcanization accelerator aid C: zinc oxide ("Zeonet ZP" manufactured by Nippon Zeon Co., Ltd.); added by masterbatching Activator: organic amine ("Acting SL" manufactured by Yoshitomi Pharmaceutical Industrial Co., Ltd.)

Plasticizer: adipic acid-derived polyester ("PN-350" manufactured by Asahi Denka Kogyo K.K.)

Wear resistance improver: particles of carboxyl-modified polyethylene ("Modic APH501" manufactured by Mitsubishi Chemical Corp.)

Antioxidant A: 4,4-bis($\alpha,\alpha$-dimethylbenzyl)-diphenylamine ("Nocrac CD" manufactured by Ouchi-Shinko Chemical Industrial Co., Ltd.)

Antioxidant B: 2-mercaptobenzimidazole ("Nocrac MB" manufactured by Ouchi-Shinko Chemical Industrial Co., Ltd.)

Antioxidant C: special wax ("Sunnoc" manufactured by Ouchi-Shinko Chemical Industrial Co., Ltd.)

Lubricating oil: amino-modified silicone oil ("KF-860" manufactured by Shin-Etsu Silicone Co., Ltd.)

Coupling agent: γ-mercaptopropyltrimethoxysilane ("KBM 803" manufactured by Shin-Etsu Silicone Co., Ltd.)

FIRST EMBODIMENT

Rubber compositions Nos. 1-1 to 1-5 respectively having the compositions shown in the following Table 1 were prepared.

TABLE 1

| No. | 1-1 | 1-2 | 1-3 | 1-4 | 1-5 |
|---|---|---|---|---|---|
| Raw rubber A | 100.0 | 100.0 | | 100.0 | |
| Raw rubber B | | | 100.0 | | |
| Raw rubber C | | | | | 100.0 |
| Carbon black A | 60.0 | | 50.0 | 60.0 | |
| Silica | | 60.0 | | | 50.0 |
| Vulcanizing agent | 0.5 | 0.5 | 0.5 | 0.5 | 0.5 |

TABLE 1-continued

| No. | 1-1 | 1-2 | 1-3 | 1-4 | 1-5 |
|---|---|---|---|---|---|
| Vulcanization accelerator A | 0.8 | 0.8 | 0.8 | 0.8 | 0.8 |
| Vulcanization accelerator B | 1.5 | 1.5 | 1.5 | 1.5 | 1.5 |
| Vulcanization accelerator C | 1.0 | 1.0 | 1.0 | 1.0 | 1.0 |
| Vulcanization accelerator aid A | 1.0 | 1.0 | 1.0 | 1.0 | 1.0 |
| Vulcanization accelerator aid B | 5.0 | 5.0 | | 5.0 | 5.0 |
| Vulcanization accelerator aid C | | | 5.0 | | |
| Activator | | 2.0 | | | 2.0 |
| Plasticizer | 5.0 | 5.0 | 5.0 | 5.0 | 5.0 |
| Wear resistance improver | | | 20.0 | | |
| Antioxidant A | 1.0 | 1.0 | 1.0 | 1.0 | 1.0 |
| Antioxidant B | 1.0 | 1.0 | 1.0 | 1.0 | 1.0 |
| Antioxidant C | 1.0 | 1.0 | 1.0 | 1.0 | 1.0 |
| Lubricating oil | | | | 5.0 | |
| Coupling agent | | 2.0 | | | 2.0 |

These rubber compositions were used to produce test pieces for a hardness test in the following manner.

First, the ingredients excluding the vulcanizing agent and vulcanization accelerators were introduced into a Banbury mixer and kneaded at a mixer temperature of 80° C. (first kneading step). The resultant mixture was taken out of the Banbury mixer and introduced into a two-roll mill for rubbers. Subsequently, while the roll temperature was being regulated to 50° C., the vulcanizing agent and vulcanization accelerators were introduced into the roll mill and a cutting operation was conducted until the mixture became homogeneous (second kneading step). Thereafter, the resultant composition was formed into a sheet.

Subsequently, a vulcanizing mold for 2 mm-thick sheets was attached to a hot press heated to 170° C., and the sheet obtained in the second kneading step was placed in the mold. This sheet was heated and pressed for 15 minutes to obtain a vulcanized rubber sheet having a length of 150 mm, width of 150 mm, and thickness of 2 mm. Pieces of the JIS No. 3 test piece shape were punched out of the vulcanized rubber sheet. Thus, test pieces for a hardness test were obtained.

Three of the test pieces were stacked up and examined for hardness with spring hardness scale A in accordance with JIS K6301.

On the other hand, a test piece for a kinematic viscoelasticity test was cut out of a hub unit seal 10 shown in FIG. 3 produced by the method which will be described later. This test piece had effective dimensions of 10 mm×2.7 mm×0.5 mm (thickness).

This test piece was subjected to a kinematic viscoelasticity test in which a sinusoidal oscillatory load was imposed at ambient temperatures ranging from 10 to 120° C. in accordance with JIS K 7244-4. The loss tangent (tan δ) was determined at each temperature in that temperature range. As a testing machine was used viscoelastic tester "RSA-II" manufactured by Rheometric Scientific FE. The test was conducted in the tensile mode under the conditions of a frequency of 10 Hz, initial strain of 2.0%, and dynamic strain of 0.1%.

The results of those tests are shown in Table 2 below. With respect to tan δ, the maximum value thereof as obtained in the ambient temperature range of from 10 to 120° C. is shown in Table 2.

TABLE 2

| No. | 1-1 | 1-2 | 1-3 | 1-4 | 1-5 |
|---|---|---|---|---|---|
| Hardness | 78 | 75 | 78 | 73 | 70 |
| Maximum value of tan δ | 0.32 | 0.50 | 0.26 | 0.29 | 0.54 |

The results given in Table 2 show the following. The molded rubbers obtained by vulcanizing and molding rubber compositions Nos. 1-1 to 1-5 each had a hardness as measured with spring hardness scale A of 70 or higher. Furthermore, the molded rubbers (moldings Nos. 1-1 to 1-4) obtained by vulcanizing and molding rubber compositions Nos. 1-1 to 1-4 each had a maximum value of loss tangent (tan δ) of 0.50 or smaller in the range of from 10 to 120° C., whereas the molded rubber (molding No. 1-5) obtained by vulcanizing and molding rubber composition No. 1-5 had a maximum value of loss tangent (tan δ) exceeding 0.50 in that temperature range.

Figure 2:
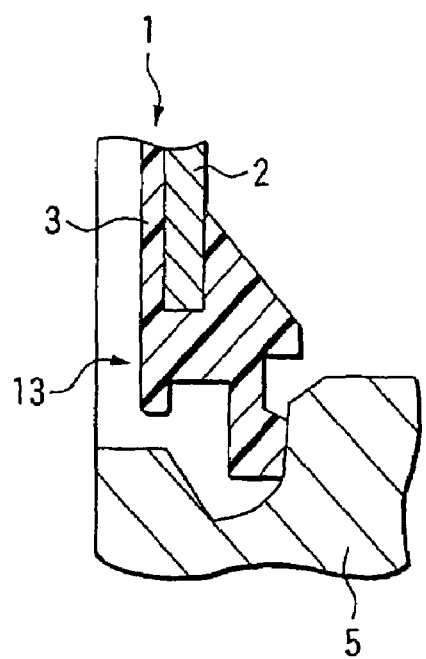
FIG. 2 is a sectional view illustrating the shape of the lip of each of rolling bearing seals produced in Embodiments.

A seal 1 for rolling bearings which is shown in FIG. 1 was produced in the following manner. A core metal 2 made of SPCC was placed in a vulcanizing mold for seal formation together with each of rubber compositions Nos. 1-1 to 1-5. The core metal and the rubber composition were press-molded with heating. Thus, a vulcanized molding was formed from each rubber composition integrally with the core metal 2 so that the vulcanized molding was located as an elastic body 3 on the outer side of the core metal 2. The lip 13 of this elastic body 3 had the shape shown in FIG. 2.

Each of the seals 1 obtained (seals in which the elastic body 3 was each of moldings Nos. 1-1 to 1-5) was fitted into the space between the inner ring 5 and outer ring 4 of a single-line deep-groove ball bearing 6203 (bearing number) (the rolling bearing shown in FIG. 1) manufactured by NSK Ltd. This bearing was set on a bearing rotation tester manufactured by NSK Ltd. An ether type grease was applied to the sealed bearing, which was rotated under the conditions of an ambient temperature of 80° C., rotational speed of 10,000 rpm, and rotational period of 1,000 hours and then examined for grease leakage and lip breakage.

The results of the test are shown in Table 3 below. The occurrence of grease leakage or lip breakage is indicated by X and nonoccurrence is indicated by ○.

TABLE 3

| No. | 1-1 | 1-2 | 1-3 | 1-4 | 1-5 |
|---|---|---|---|---|---|
| Grease leakage | ○ | ○ | ○ | ○ | X |
| Seal breakage | ○ | ○ | ○ | ○ | X |

The results given in Table 3 show the following. The bearings equipped with seals Nos. 1-1 to 1-4 respectively having moldings Nos. 1-1 to 1-4 as the elastic body 3 suffered neither grease leakage nor seal breakage in the rotation test. In contrast, the bearing equipped with seal No. 1-5 having molding No. 1-5 as the elastic body 3 suffered grease leakage and seal breakage in the rotation test.

A seal 10 shown in FIG. 3 for a hub unit 6 was produced in the following manner. A core metal 20 made of SPCC was placed in a vulcanizing mold for seal formation together with each of rubber compositions Nos. 1-1 to 1-5. The core metal and the rubber composition were press-molded with heating. Thus, a vulcanized molding was formed as an elastic body 30 from each rubber composition integrally with the core metal 20. The lips 31 to 33 of this elastic body 30 had the respective shapes shown in FIG. 3.

Figure 3:
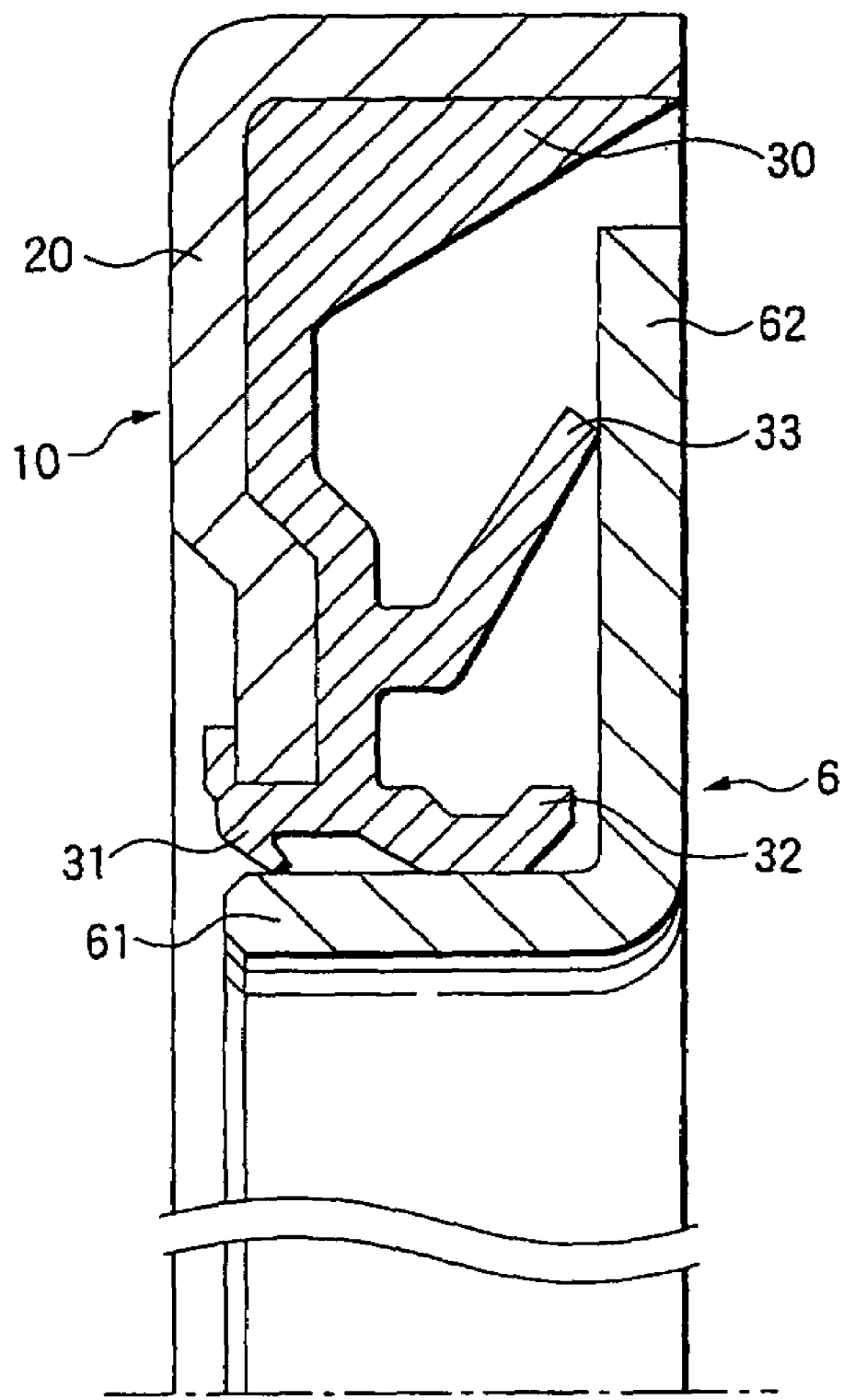
FIG. 3 is a sectional view illustrating an example of sealed hub units.

Each of the seals 10 obtained (seals in which the elastic body 30 was each of the moldings Nos. 1-1 to 1-5) was attached to a hub unit 6 shown in FIG. 3 in which the hub 61 had an inner diameter of 60 mm. This hub unit was set on a hub unit rotation tester manufactured by NSK Ltd. The shaft eccentricity was regulated to each of various values ranging from 0 to 0.7 mm TIR (total indicator reading) and the hub unit was rotated under the following conditions while pouring muddy water on the hub unit 6 and the seal 10. Conditions for muddy water supply: repetitions of 10-second pouring of muddy water at a rate of 2 liter/min and 20-second suspension of the muddy-water pouring. The grease applied to the sealed space between the hub unit 6 and the seal 10 was a mineral oil grease. Ambient temperature, room temperature; rotational speed, 1,000 rpm; rotational period, 50 hours.

After this rotation test, each test structure was examined for the amount of water contained in the grease enclosed therein. Based on the proportion of this water amount (weight) to the weight of the grease, the seal 10 was evaluated for the sliding-contact properties of the lips 31 to 33 on the hub unit 6.

The structures in which that water content was 1.0% or lower were judged to be satisfactory (○) in the sliding-contact properties of the lips 31 to 33 of the seal 10 on the hub unit 6, those in which that water content was from higher than 1.0 to lower than 5.0% were judged to be slightly poor (Δ), and those in which that water content was 5.0% or higher were judged to be poor (X). The results of this test are shown in Table 4 below.

Furthermore, a thermocouple was inserted into the lip 32 (main lip) of each seal 10, and the hub unit was rotated while regulating the shaft eccentricity to 0. When the rotation had become stable (after the hub unit had been rotated for 30 hours or more), the temperature of the lip 32 (main lip) was measured. The results obtained are shown in Table 5 below.

TABLE 4

| No. | Maximum value of tan δ | Evaluation of sliding-contact property at each shaft eccentricity (mm TIR) | | | | | | | | | | | | | | |
|---|---|---|---|---|---|---|---|---|---|---|---|---|---|---|---|---|
| | | 0.00 | 0.05 | 0.10 | 0.15 | 0.20 | 0.25 | 0.30 | 0.35 | 0.40 | 0.45 | 0.50 | 0.55 | 0.60 | 0.65 | 0.70 |
| 1-1 | 0.32 | ○ | ○ | ○ | ○ | ○ | ○ | ○ | ○ | ○ | ○ | ○ | ○ | ○ | ○ | ○ |
| 1-2 | 0.50 | ○ | ○ | ○ | ○ | ○ | ○ | ○ | ○ | ○ | ○ | ○ | ○ | ○ | Δ | Δ |
| 1-3 | 0.26 | ○ | ○ | ○ | ○ | ○ | ○ | ○ | ○ | ○ | ○ | ○ | ○ | ○ | ○ | ○ |
| 1-4 | 0.29 | ○ | ○ | ○ | ○ | ○ | ○ | ○ | ○ | ○ | ○ | ○ | ○ | ○ | ○ | ○ |
| 1-5 | 0.54 | ○ | Δ | Δ | Δ | X | X | X | X | X | X | X | X | X | X | X |

TABLE 5

| No. | 1-1 | 1-2 | 1-3 | 1-4 | 1-5 |
|---|---|---|---|---|---|
| Temperature of main lip (° C.) | 72 | 75 | 62 | 45 | 89 |

The results given in Table 4 show the following. In the case where the shaft eccentricity was 0, all the structures respectively equipped with seals Nos. 1-1 to 1-5 were satisfactory in the sliding-contact properties of the lips on the hub unit in the rotation test. However, when the shaft eccentricity was in the range of from 0.05 to 0.15 mm TIR, the structure equipped with seal No. 1-5 (the seal in which the elastic body had a maximum value of loss tangent (tan δ) of 0.54 in the temperature range of from 10 to 120° C.) had slightly poor lip sliding-contact properties on the hub unit in the rotation test. This structure had poor lip sliding-contact properties when the shaft eccentricity was 0.20 mm TIR or more.

In contrast, the structures respectively equipped with seals Nos. 1-1, 1-3, and 1-4 (the seals in which the elastic body had a maximum value of loss tangent (tan δ) of 0.32 or smaller in the temperature range of from 10 to 120° C.) were satisfactory in the sliding-contact properties of the lips on the hub unit in the rotation test even when the shaft eccentricity was 0.70 mm TIR. Furthermore, the structure equipped with seal No. 1-2 (the seal in which the elastic body had a maximum value of loss tangent (tan δ) of 0.50 in the temperature range of from 10 to 120° C.) had satisfactory lip sliding-contact properties on the hub unit in the rotation test when the shaft eccentricity was in the range of from 0 to 0.60 mm TIR. However, this structure had slightly poor lip sliding-contact properties when the shaft eccentricity was in the range of from 0.65 to 0.70 mm TIR.

The results given in Table 5 show the following. The structure equipped with seal No. 1-5 (the seal in which the elastic body had a maximum value of loss tangent (tan δ) of 0.54 in the temperature range of from 10 to 120° C.) had a main-lip temperature of 89° C., which was higher than the main-lip temperatures of from 45 to 75° C. for the structures respectively equipped with seals Nos. 1-1 to 1-4 (the seals in which the elastic body had a maximum value of loss tangent (tan δ) of from 0.26 to 0.50 in the temperature range of from 10 to 120° C.).

The reason why the temperature of the main lip of seal No. 1-5 increased to 89° C. may be as follows. This main lip was in poor sliding contact with the hub unit and the force at which the main lip pushed itself against the hub (shaft) was uneven in the shaft circumference direction, resulting in heat generation. Furthermore, in seal No. 1-4, the main-lip temperature was as low as 45° C. because the elastic body thereof was made of a molded rubber containing a silicone oil and, hence, the main lip had high lubricity.

SECOND EMBODIMENT

Rubber compositions Nos. 2-1 to 2-11 respectively having the compositions shown in the following Table 6 were prepared.

TABLE 6

| No. | 2-1 | 2-2 | 2-3 | 2-4 | 2-5 | 2-6 | 2-7 | 2-8 | 2-9 | 2-10 | 2-11 |
|---|---|---|---|---|---|---|---|---|---|---|---|
| Raw rubber A | | 100.0 | 100.0 | | 100.0 | | | | | | |
| Raw rubber B | | | | 100.0 | | | | | | | |
| Raw rubber C | | | | | | 100.0 | | | | | |
| Raw rubber D | 100.0 | | | | | | | | | | |
| Raw rubber E | | | | | | | 100.0 | | | | |
| Raw rubber F | | | | | | | | 100.0 | | | |
| Raw rubber G | | | | | | | | | 100.0 | | |
| Raw rubber H | | | | | | | | | | 100.0 | |
| Raw rubber I | | | | | | | | | | | 100.0 |
| Carbon black A | 60.0 | 60.0 | | 40.0 | 60.0 | 60.0 | 60.0 | 60.0 | 60.0 | 60.0 | 60.0 |
| Silica | | | 60.0 | | | | | | | | |
| Vulcanizing agent | 0.5 | 0.5 | 0.5 | 0.5 | 0.5 | 0.5 | 0.5 | 0.5 | 0.5 | 0.5. | 0.5 |
| Vulcanization accelerator A | 0.8 | 0.8 | 0.8 | 0.8 | 0.8 | 0.8 | 0.8 | 0.8 | 0.8 | 0.8 | 0.8 |
| Vulcanization accelerator B | 1.5 | 1.5 | 1.5 | 1.5 | 1.5 | 1.5 | 1.5 | 1.5 | 1.5 | 1.5 | 1.5 |
| Vulcanization accelerator C | 1.0 | 1.0 | 1.0 | 1.0 | 1.0 | 1.0 | 1.0 | 1.0 | 1.0 | 1.0 | 1.0 |
| Vulcanization accelerator aid A | 1.0 | 1.0 | 1.0 | 1.0 | 1.0 | 1.0 | 1.0 | 1.0 | 1.0 | 1.0 | 1.0 |
| Vulcanization accelerator aid B | 5.0 | 5.0 | 5.0 | | 5.0 | 5.0 | 5.0 | 5.0 | 5.0 | 5.0 | 5.0 |
| Vulcanization accelerator aid C | | | | 5.0 | | | | | | | |
| Activator | | | 2.0 | | | | | | | | |
| Plasticizer | 5.0 | 5.0 | 5.0 | 5.0 | 5.0 | 5.0 | 5.0 | 5.0 | 5.0 | 5.0 | 5.0 |
| Wear resistance improver | | | | 20.0 | | | | | | | |
| Antioxidant A | 1.0 | 1.0 | 1.0 | 1.0 | 1.0 | 1.0 | 1.0 | 1.0 | 1.0 | 1.0 | 1.0 |
| Antioxidant B | 1.0 | 1.0 | 1.0 | 1.0 | 1.0 | 1.0 | 1.0 | 1.0 | 1.0 | 1.0 | 1.0 |
| Antioxidant C | 1.0 | 1.0 | 1.0 | 1.0 | 1.0 | 1.0 | 1.0 | 1.0 | 1.0 | 1.0 | 1.0 |
| Lubricating oil | | | | | | 5.0 | | | | | |
| Coupling agent | | | 2.0 | | | | | | | | |

These rubber compositions were used to produce test pieces for a hardness test in the following manner.

First, the ingredients excluding the vulcanizing agent and vulcanization accelerators were introduced into a Banbury mixer and kneaded at a mixer temperature of 80° C. (first kneading step). The resultant mixture was taken out of the Banbury mixer and introduced into a two-roll mill for rubbers. Subsequently, while the roll temperature was being regulated to 50° C., the vulcanizing agent and vulcanization accelerators were introduced into the roll mill and a cutting operation was conducted until the mixture became homogeneous (second kneading step). Thereafter, the resultant composition was formed into a sheet.

Subsequently, a vulcanizing mold for 2 mm-thick sheets was attached to a hot press heated to 170° C., and the sheet obtained in the second kneading step was placed in the mold. This sheet was heated and pressed for 15 minutes to obtain a vulcanized rubber sheet having a length of 150 mm, width of 150 mm, and thickness of 2 mm. Pieces of the JIS No. 3 test piece shape were punched out of the vulcanized rubber sheet. Thus, test pieces for a hardness test were obtained.

Three of the test pieces were stacked up and examined for hardness with spring hardness scale A in accordance with JIS K6301.

On the other hand, test pieces for a kinematic viscoelasticity test were cut out respectively of a rolling bearing seal 1 shown in FIG. 1 and a hub unit seal 10 shown in FIG. 3 which were produced by the methods which will be described later. The test piece cut out of the seal 1 had effective dimensions of 4 mm×20 mm×0.8 mm (thickness), and the test piece cut out of the seal 10 had effective dimensions of 10 mm×2.7 mm×0.5 mm (thickness).

These test pieces were subjected to a kinematic viscoelasticity test in which a sinusoidal oscillatory load was imposed at ambient temperatures ranging from 20 to 70° C. in accordance with JIS K 7244-4. The loss tangent (tan δ) was determined at each temperature in that temperature range. As a testing machine was used viscoelastic tester "RSA-III" manufactured by Rheometric Scientific FE. The test was conducted in the tensile mode under the conditions of a frequency of 10 Hz, initial strain of 2.0%, and dynamic strain of 0.1%.

The results of those tests are shown in Table 7 below. With respect to tan δ, the maximum value thereof as obtained in the ambient temperature range of from 20 to 70° C. is shown in Table 7.

TABLE 7

| No. | Hardness | Maximum value of tan δ | |
| --- | --- | --- | --- |
| | | Seal for bearing | Seal for hub unit |
| 2-1 | 77 | 0.15 | 0.15 |
| 2-2 | 78 | 0.21 | 0.22 |
| 2-3 | 75 | 0.40 | 0.40 |
| 2-4 | 77 | 0.17 | 0.17 |
| 2-5 | 73 | 0.18 | 0.19 |
| 2-6 | 76 | 0.45 | 0.44 |
| 2-7 | 72 | 0.11 | 0.11 |
| 2-8 | 75 | 0.13 | 0.13 |
| 2-9 | 76 | 0.19 | 0.18 |
| 2-10 | 78 | 0.26 | 0.26 |
| 2-11 | 76 | 0.41 | 0.42 |

The results given in Table 7 show the following. The molded rubbers obtained by vulcanizing and molding rubber compositions Nos. 2-1 to 2-11 each had a hardness as measured with spring hardness scale A of 70 or higher. Furthermore, the molded rubbers (moldings Nos. 2-1 to 2-5 and 2-7 to 2-10) obtained by vulcanizing and molding rubber compositions Nos. 2-1 to 2-5 and 2-7 to 2-10 each had a maximum value of loss tangent (tan δ) of 0.40 or smaller in the range of from 20 to 70° C. with respect to each of the bearing seal and the hub unit seal, whereas the molded rubbers (moldings Nos. 2-6 and 2-11) obtained by vulcanizing and molding rubber compositions Nos. 2-6 and 2-11 had a maximum value of loss tangent (tan δ) exceeding 0.40 in that temperature range with respect to each of the bearing seal and the hub unit seal.

A seal 1 for rolling bearings which is shown in FIG. 1 was produced in the following manner. A core metal 2 made of SPCC was placed in a vulcanizing mold for seal formation together with each of rubber compositions Nos. 2-1 to 2-11. The core metal and the rubber composition were press-molded with heating. Thus, a vulcanized molding was formed from each rubber composition integrally with the core metal 2 so that the vulcanized molding was located as an elastic body 3 on the outer side of the core metal 2. The lip 13 of this elastic body 3 had the shape shown in FIG. 2.

Each of the seals 1 obtained (seals in which the elastic body 3 was each of moldings Nos. 2-1 to 2-11) was fitted into the space between the inner ring 5 and outer ring 4 of a single-line deep-groove ball bearing 6203 (bearing number) (the rolling bearing shown in FIG. 1) manufactured by NSK Ltd. This bearing was set on a bearing rotation tester manufactured by NSK Ltd. An ether type grease was applied to the sealed bearing, which was rotated under the conditions of an ambient temperature of 80° C., rotational speed of 10,000 rpm, and rotational period of 1,000 hours and then examined for grease leakage and lip breakage.

The results of the test are shown in Table 8 below. The occurrence of grease leakage or lip breakage is indicated by X and nonoccurrence is indicated by ○.

TABLE 8

| No. | Grease leakage | Seal breakage |
| --- | --- | --- |
| 2-1 | ○ | ○ |
| 2-2 | ○ | ○ |
| 2-3 | ○ | ○ |
| 2-4 | ○ | ○ |
| 2-5 | ○ | ○ |
| 2-6 | X | X |
| 2-7 | ○ | ○ |
| 2-8 | ○ | ○ |
| 2-9 | ○ | ○ |
| 2-10 | ○ | ○ |
| 2-11 | X | X |

The results given in Table 8 show the following. The bearings equipped with seals Nos. 2-1 to 2-5 and 2-7 to 2-10 respectively having moldings Nos. 2-1 to 2-5 and 2-7 to 2-10 as the elastic body 3 suffered neither grease leakage nor seal breakage in the rotation test. In contrast, the bearings equipped with seals Nos. 2-6 and 2-11 respectively having moldings Nos. 2-6 and 2-11 as the elastic body 3 suffered grease leakage and seal breakage in the rotation test.

A seal 10 shown in FIG. 3 for a hub unit 6 was produced in the following manner. A core metal 20 made of SPCC was placed in a vulcanizing mold for seal formation together with each of rubber compositions Nos. 2-1 to 2-11. The core metal and the rubber composition were press-molded with heating. Thus, a vulcanized molding was formed as an elastic body 30 from each rubber composition integrally with the core metal 20. The lips 31 to 33 of this elastic body 30 had the respective shapes shown in FIG. 3.

Each of the seals 10 obtained (seals in which the elastic body 30 was each of the moldings Nos. 2-1 to 2-11) was attached to a hub unit 6 shown in FIG. 3 in which the hub 61 had an inner diameter of 60 mm. This hub unit was set on a hub unit rotation tester manufactured by NSK Ltd. The shaft eccentricity was regulated to each of various values ranging from 0 to 0.7 mm TIR (total indicator reading) and the hub unit was rotated under the following conditions while pouring muddy water on the hub unit 6 and the seal 10. Conditions for muddy water supply: repetitions of 10-second pouring of muddy water at a rate of 2 liter/min and 20-second suspension of the muddy-water pouring. The grease applied to the sealed space between the hub unit 6 and the seal 10 was a mineral oil grease. Ambient temperature, room temperature; rotational speed, 1,000 rpm; rotational period, 50 hours.

After this rotation test, each test structure was examined for the amount of water contained in the grease enclosed therein. Based on the proportion of this water amount (weight) to the weight of the grease, the seal 10 was evaluated for the sliding-contact properties of the lips 31 to 33 on the hub unit 6.

The structures in which that water content was 1.0% or lower were judged to be satisfactory (◯) in the sliding-contact properties of the lips 31 to 33 of the seal 10 on the hub unit 6, those in which that water content was from higher than 1.0 to lower than 5.0% were judged to be slightly poor (Δ), and those in which that water content was 5.0% or higher were judged to be poor (X). The results of this test are shown in Table 9 below.

Furthermore, a thermocouple was inserted into the lip 32 (main lip) of each seal 10, and the hub unit was rotated while regulating the shaft eccentricity to 0. When the rotation had become stable (after the hub unit had been rotated for 30 hours or more), the temperature of the lip 32 (main lip) was measured. The results obtained are shown in Table 10 below.

δ) of 0.44 in the temperature range of from 20 to 70° C.) had slightly poor lip sliding-contact properties on the hub unit in the rotation test. This structure had poor lip sliding-contact properties when the shaft eccentricity was 0.20 mm TIR or more.

Furthermore, the structure equipped with seal No. 2-11 (the seal in which the elastic body had a maximum value of loss tangent (tan δ) of 0.42 in the temperature range of from 20 to 70° C.) had slightly poor lip sliding-contact properties on the hub unit in the rotation test when the shaft eccentricity was in the range of from 0.15 to 0.25 mm TIR. This structure had poor lip sliding-contact properties when the shaft eccentricity was 0.30 mm TIR or more.

In contrast, the structures respectively equipped with seals Nos. 2-1, 2-2, 2-4, 2-5, and 2-7 to 2-10 (the seals in which the elastic body had a maximum value of loss tangent (tan δ) of from 0.11 to 0.26 in the temperature range of from 20 to 70° C.) were satisfactory in the sliding-contact properties of the lips on the hub unit in the rotation test even when the shaft eccentricity was 0.70 mm TIR. Furthermore, the structure equipped with seal No. 2-3 (the seal in which the elastic body had a maximum value of loss tangent (tan δ) of 0.40 in the temperature range of from 20 to 70° C.) had satisfactory lip sliding-contact properties on the hub unit in the rotation test when the shaft eccentricity was in the range of

TABLE 9

| No. | Maximum value of tan δ | Evaluation of sliding-contact property at each shaft eccentricity (mm TIR) | | | | | | | | | | | | | | |
|---|---|---|---|---|---|---|---|---|---|---|---|---|---|---|---|---|
| | | 0.00 | 0.05 | 0.10 | 0.15 | 0.20 | 0.25 | 0.30 | 0.35 | 0.40 | 0.45 | 0.50 | 0.55 | 0.60 | 0.65 | 0.70 |
| 2-1 | 0.15 | ◯ | ◯ | ◯ | ◯ | ◯ | ◯ | ◯ | ◯ | ◯ | ◯ | ◯ | ◯ | ◯ | ◯ | ◯ |
| 2-2 | 0.22 | ◯ | ◯ | ◯ | ◯ | ◯ | ◯ | ◯ | ◯ | ◯ | ◯ | ◯ | ◯ | ◯ | ◯ | ◯ |
| 2-3 | 0.40 | ◯ | ◯ | ◯ | ◯ | ◯ | ◯ | ◯ | ◯ | ◯ | ◯ | ◯ | ◯ | Δ | Δ | Δ |
| 2-4 | 0.17 | ◯ | ◯ | ◯ | ◯ | ◯ | ◯ | ◯ | ◯ | ◯ | ◯ | ◯ | ◯ | ◯ | ◯ | ◯ |
| 2-5 | 0.19 | ◯ | ◯ | ◯ | ◯ | ◯ | ◯ | ◯ | ◯ | ◯ | ◯ | ◯ | ◯ | ◯ | ◯ | ◯ |
| 2-6 | 0.44 | ◯ | Δ | Δ | Δ | X | X | X | X | X | X | X | X | X | X | X |
| 2-7 | 0.11 | ◯ | ◯ | ◯ | ◯ | ◯ | ◯ | ◯ | ◯ | ◯ | ◯ | ◯ | ◯ | ◯ | ◯ | ◯ |
| 2-8 | 0.13 | ◯ | ◯ | ◯ | ◯ | ◯ | ◯ | ◯ | ◯ | ◯ | ◯ | ◯ | ◯ | ◯ | ◯ | ◯ |
| 2-9 | 0.18 | ◯ | ◯ | ◯ | ◯ | ◯ | ◯ | ◯ | ◯ | ◯ | ◯ | ◯ | ◯ | ◯ | ◯ | ◯ |
| 2-10 | 0.26 | ◯ | ◯ | ◯ | ◯ | ◯ | ◯ | ◯ | ◯ | ◯ | ◯ | ◯ | ◯ | ◯ | ◯ | ◯ |
| 2-11 | 0.42 | ◯ | ◯ | ◯ | Δ | Δ | Δ | X | X | X | X | X | X | X | X | X |

TABLE 10

| No. | Temperature of main lip (° C.) |
|---|---|
| 2-1 | 70 |
| 2-2 | 72 |
| 2-3 | 75 |
| 2-4 | 62 |
| 2-5 | 45 |
| 2-6 | 78 |
| 2-7 | 69 |
| 2-8 | 71 |
| 2-9 | 70 |
| 2-10 | 71 |
| 2-11 | 77 |

The results given in Table 9 show the following. In the case where the shaft eccentricity was 0, all the structures respectively equipped with seals Nos. 2-1 to 2-11 were satisfactory in the sliding-contact properties of the lips on the hub unit in the rotation test. However, when the shaft eccentricity was in the range of from 0.05 to 0.15 mm TIR, the structure equipped with seal No. 2-6 (the seal in which the elastic body had a maximum value of loss tangent (tan from 0 to 0.55 mm TIR. However, this structure had slightly poor lip sliding-contact properties when the shaft eccentricity was in the range of from 0.60 to 0.70 mm TIR.

The results given in Table 10 show the following. The structures respectively equipped with seals Nos. 2-6 and 2-11 (the seals in which the elastic body had a maximum value of loss tangent (tan δ) of 0.44 or 0.42 in the temperature range of from 20 to 70° C.) had main-lip temperatures of 78° C. and 77° C., which were higher than the main-lip temperatures of from 45 to 75° C. for the structures respectively equipped with seals Nos. 2-1 to 2-5 and 2-6 to 2-10 (the seals in which the elastic body had a maximum value of loss tangent (tan δ) of from 0.11 to 0.40 in the temperature range of from 20 to 70° C.).

The reason why the temperatures of the main lips of seals Nos. 2-6 and 2-11 rose high may be as follows. These main lips each was in poor sliding contact with the hub unit and the force at which each main lip pushed itself against the hub (shaft) was uneven in the shaft circumference direction, resulting in heat generation. Furthermore, in seal No. 2-5, the main-lip temperature was as low as 45° C. because the elastic body thereof was made of a molded rubber containing a silicone oil and, hence, the main lip had high lubricity.

Figure 4:
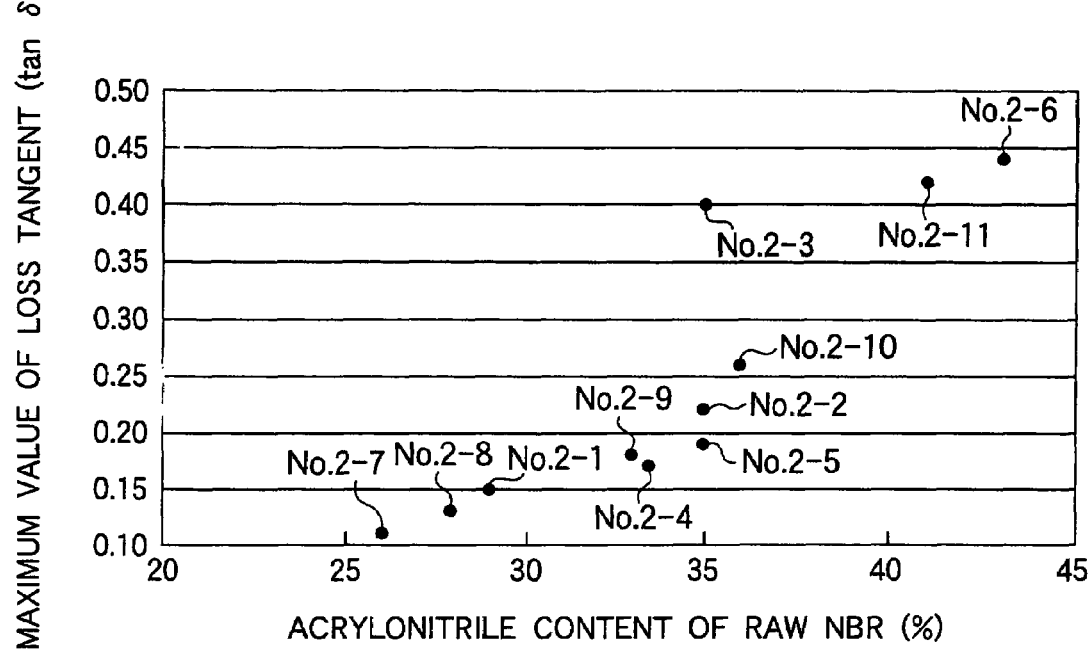
FIG. 4 is a graph showing the relationship between the acrylonitrile content of the raw NBR in samples produced in an Embodiment and the maximum value of tan $\delta$ (maximum value in the ambient temperature range of from 20 to 70° C.) as determined through an examination of test pieces cut out of the hub unit seals.

In this embodiment, various nitrile rubbers (NBR) differing in acrylonitrile content were used as raw rubbers as shown above. FIG. 4 is graphically shown the relationship between the acrylonitrile content of the raw rubber in the composition samples and the maximum value of loss tangent (tan δ) (maximum value in the ambient temperature range of from 20 to 70° C.) as determined through an examination of test pieces cut out of the hub unit seals.

Compositions Nos. 2-2, 2-3, and 2-5 have the same acrylonitrile content (35%) in the raw NBR. However, composition No. 2-3 considerably differs from compositions Nos. 2-1 and 2-6 to 2-11 in that it contains no carbon black and contains silica and a coupling agent. Furthermore, sample No. 2-5 considerably differs from the other samples in that it contains a lubricating oil. Because of these, sample No. 2-2 is used as the sample having an acrylonitrile content of 35% to be compared with other samples.

It can be seen from the graph given in FIG. 4 that the higher the acrylonitrile content in the raw NBR, the larger the maximum value of tan δ (maximum value in the ambient temperature range of from 20 to 70° C.).

The seals obtained from samples Nos. 2-6 and 2-11, which had a maximum value of tan δ larger than 0.40, had showed poor sealing properties (in the tests described above, these seals caused grease leakage, suffered breakage, and showed poor sliding-contact properties even at a relatively low shaft eccentricity). The following can hence be presumed. The lower the acrylonitrile content in the nitrile rubber used as a raw rubber, the higher the sealing properties of the seal obtained.

When a nitrile rubber is used as a raw rubber, the acrylonitrile content thereof is preferably from 26 to 36%. Moldings obtained from nitrile rubbers having an acrylonitrile content lower than 26% show insufficient adhesion to the core metal. On the other hand, as the acrylonitrile content of nitrile rubbers increases beyond 36%, the maximum value of tan δ of the nitrile rubber moldings increases abruptly, resulting in insufficient lip sliding-contact properties on seal contact surfaces.

THIRD EMBODIMENT

Rubber compositions Nos. 3-1 to 3-12 respectively having the compositions shown in Table 11 were prepared.

These rubber compositions were used to produce test pieces for a hardness test (JIS No. 3 test pieces) in the same manner as in the second embodiment described above. Three of the test pieces were stacked up and examined for hardness with spring hardness scale A in accordance with JIS K6301.

On the other hand, test pieces for a kinematic viscoelasticity test were cut out respectively of a rolling bearing seal 1 shown in FIG. 1 and a hub unit seal 10 shown in FIG. 3 which were produced by the methods which will be described later. The test piece cut out of the seal 1 had effective dimensions of 4 mm×20 mm×0.8 mm (thickness), and the test piece cut out of the seal 10 had effective dimensions of 10 mm×2.7 mm×0.5 mm (thickness).

These test pieces were subjected to a kinematic viscoelasticity test in which a sinusoidal oscillatory load was imposed at ambient temperatures ranging from 20 to 70° C. in accordance with JIS K 7244-4. The loss tangent (tan δ) was determined at each temperature in that temperature range. As a testing machine was used viscoelastic tester "RSA-III" manufactured by Rheometric Scientific FE. The test was conducted in the tensile mode under the conditions of a frequency of 10 Hz, initial strain of 2.0%, and dynamic strain of 0.1%.

The results of those tests are shown in Table 12 below. With respect to tan δ, the maximum value thereof as obtained in the ambient temperature range of from 20 to 70° C. is shown in Table 12.

TABLE 12

| | | Maximum value of tan δ | |
|---|---|---|---|
| No. | Hardness | Seal for bearing | Seal for hub unit |
| 3-1 | 75 | 0.26 | 0.26 |
| 3-2 | 76 | 0.30 | 0.31 |
| 3-3 | 75 | 0.36 | 0.36 |
| 3-4 | 75 | 0.40 | 0.40 |
| 3-5 | 74 | 0.16 | 0.16 |
| 3-6 | 75 | 0.15 | 0.15 |
| 3-7 | 75 | 0.15 | 0.14 |
| 3-8 | 76 | 0.13 | 0.13 |
| 3-9 | 75 | 0.12 | 0.12 |
| 3-10 | 75 | 0.11 | 0.11 |
| 3-11 | 75 | 0.09 | 0.08 |
| 3-12 | 73 | 0.14 | 0.14 |

TABLE 11

| No. | 3-1 | 3-2 | 3-3 | 3-4 | 3-5 | 3-6 | 3-7 | 3-8 | 3-9 | 3-10 | 3-11 | 3-12 |
|---|---|---|---|---|---|---|---|---|---|---|---|---|
| Raw rubber G | 100.0 | 100.0 | 100.0 | 100.0 | 100.0 | 100.0 | 100.0 | 100.0 | 100.0 | 100.0 | 100.0 | 100.0 |
| Carbon black B | | | | | 70.0 | 60.0 | 50.0 | 50.0 | 45.0 | 40.0 | 40.0 | 25.0 |
| Burned clay | | 130.0 | | | | 20.0 | 30.0 | 35.0 | 35.0 | 40.0 | 45.0 | 55.0 |
| Silane-modified clay | 120.0 | | | | | | | | | | | |
| Talc | | | 130.0 | | | | | | | | | |
| Wollastonite | | | | 130.0 | | | | | | | | |
| Vulcanizing agent | 0.5 | 0.5 | 0.5 | 0.5 | 0.5 | 0.5 | 0.5 | 0.5 | 0.5 | 0.5 | 0.5 | 0.5 |
| Vulcanization accelerator A | 0.8 | 0.8 | 0.8 | 0.8 | 0.8 | 0.8 | 0.8 | 0.8 | 0.8 | 0.8 | 0.8 | 0.8 |
| Vulcanization accelerator B | 1.5 | 1.5 | 1.5 | 1.5 | 1.5 | 1.5 | 1.5 | 1.5 | 1.5 | 1.5 | 1.5 | 1.5 |
| Vulcanization accelerator C | 1.0 | 1.0 | 1.0 | 1.0 | 1.0 | 1.0 | 1.0 | 1.0 | 1.0 | 1.0 | 1.0 | 1.0 |
| Vulcanization accelerator aid A | 1.0 | 1.0 | 1.0 | 1.0 | 1.0 | 1.0 | 1.0 | 1.0 | 1.0 | 1.0 | 1.0 | 1.0 |
| Vulcanization accelerator aid B | 5.0 | 5.0 | 5.0 | 5.0 | 5.0 | 5.0 | 5.0 | 5.0 | 5.0 | 5.0 | 5.0 | 5.0 |
| Plasticizer | 5.0 | 5.0 | 5.0 | 5.0 | 5.0 | 5.0 | 5.0 | 5.0 | 5.0 | 5.0 | 5.0 | 5.0 |
| Antioxidant A | 1.0 | 1.0 | 1.0 | 1.0 | 1.0 | 1.0 | 1.0 | 1.0 | 1.0 | 1.0 | 1.0 | 1.0 |
| Antioxidant B | 1.0 | 1.0 | 1.0 | 1.0 | 1.0 | 1.0 | 1.0 | 1.0 | 1.0 | 1.0 | 1.0 | 1.0 |
| Antioxidant C | 1.0 | 1.0 | 1.0 | 1.0 | 1.0 | 1.0 | 1.0 | 1.0 | 1.0 | 1.0 | 1.0 | 1.0 |
| Coupling agent | 2.0 | 2.0 | 2.0 | 2.0 | | 2.0 | 2.0 | 2.0 | 2.0 | 2.0 | 2.0 | 2.0 |

The results given in Table 12 show the following. The molded rubbers obtained by vulcanizing and molding rubber compositions Nos. 3-1 to 3-12 each had a hardness as measured with spring hardness scale A of 70 or higher. Furthermore, these molded rubbers each had a maximum value of loss tangent (tan δ) of 0.40 or smaller in the range of from 20 to 70° C. with respect to each of the bearing seal and the hub unit seal.

A seal 1 for rolling bearings which is shown in FIG. 1 was produced in the following manner. A core metal 2 made of SPCC was placed in a vulcanizing mold for seal formation together with each of rubber compositions Nos. 3-1 to 3-12. The core metal and the rubber composition were press-molded with heating. Thus, a vulcanized molding was formed from each rubber composition integrally with the core metal 2 so that the vulcanized molding was located as an elastic body 3 on the outer side of the core metal 2. The lip 13 of this elastic body 3 had the shape shown in FIG. 2.

Each of the seals 1 obtained (seals in which the elastic body 3 was each of moldings Nos. 3-1 to 3-12) was fitted into the space between the inner ring 5 and outer ring 4 of a single-line deep-groove ball bearing 6203 (bearing number) (the rolling bearing shown in FIG. 1) manufactured by NSK Ltd. This bearing was set on a bearing rotation tester manufactured by NSK Ltd. An ether type grease was applied to the sealed bearing, which was rotated under the conditions of an ambient temperature of 80° C., rotational speed of 10,000 rpm, and rotational period of 1,000 hours and then examined for grease leakage and lip breakage.

The results of the test are shown in Table 13 below. The occurrence of grease leakage or lip breakage is indicated by X and nonoccurrence is indicated by ○.

TABLE 13

| No. | Grease leakage | Seal breakage |
|---|---|---|
| 3-1 | ○ | ○ |
| 3-2 | ○ | ○ |
| 3-3 | ○ | ○ |
| 3-4 | ○ | ○ |
| 3-5 | ○ | ○ |
| 3-6 | ○ | ○ |
| 3-7 | ○ | ○ |
| 3-8 | ○ | ○ |
| 3-9 | ○ | ○ |
| 3-10 | ○ | ○ |
| 3-11 | ○ | ○ |
| 3-12 | ○ | ○ |

The results given in Table 13 show the following. Each of the bearings equipped with the seals respectively having moldings Nos. 3-1 to 3-12 as the elastic body 3 suffered neither grease leakage nor seal breakage in the rotation test.

A seal 10 shown in FIG. 3 for a hub unit 6 was produced in the following manner. A core metal 20 made of SPCC was placed in a vulcanizing mold for seal formation together with each of rubber compositions Nos. 3-1 to 3-12. The core metal and the rubber composition were press-molded with heating. Thus, a vulcanized molding was formed as an elastic body 30 from each rubber composition integrally with the core metal 20. The lips 31 to 33 of this elastic body 30 had the respective shapes shown in FIG. 3.

Each of the seals 10 obtained (seals in which the elastic body 30 was each of the moldings Nos. 3-1 to 3-12) was attached to a hub unit 6 shown in FIG. 3 in which the hub 61 had an inner diameter of 60 mm. This hub unit was set on a hub unit rotation tester manufactured by NSK Ltd. The shaft eccentricity was regulated to each of various values ranging from 0 to 0.7 mm TIR (total indicator reading) and the hub unit was rotated under the following conditions while pouring muddy water on the hub unit 6 and the seal 10. Conditions for muddy water supply: repetitions of 10-second pouring of muddy water at a rate of 2 liter/min and 20-second suspension of the muddy-water pouring. The grease applied to the sealed space between the hub unit 6 and the seal 10 was a mineral oil grease. Ambient temperature, room temperature; rotational speed, 1,000 rpm; rotational period, 50 hours.

After this rotation test, each test structure was examined for the amount of water contained in the grease enclosed therein. Based on the proportion of this water amount (weight) to the weight of the grease, the seal 10 was evaluated for the sliding-contact properties of the lips 31 to 33 on the hub unit 6.

The structures in which that water content was 1.0% or lower were judged to be satisfactory (○) in the sliding-contact properties of the lips 31 to 33 of the seal 10 on the hub unit 6, those in which that water content was from higher than 1.0 to lower than 5.0% were judged to be slightly poor (Δ), and those in which that water content was 5.0% or higher were judged to be poor (X). The results of this test are shown in Table 14 below.

Furthermore, a thermocouple was inserted into the lip 32 (main lip) of each seal 10, and the hub unit was rotated while regulating the shaft eccentricity to 0. When the rotation had become stable (after the hub unit had been rotated for 30 hours or more), the temperature of the lip 32 (main lip) was measured. The results obtained are shown in Table 15 below.

TABLE 14

| No. | Maximum value of tan δ | Evaluation of sliding-contact property at each shaft eccentricity (mm TIR) | | | | | | | | | | | | | | |
|---|---|---|---|---|---|---|---|---|---|---|---|---|---|---|---|---|
| | | 0.00 | 0.05 | 0.10 | 0.15 | 0.20 | 0.25 | 0.30 | 0.35 | 0.40 | 0.45 | 0.50 | 0.55 | 0.60 | 0.65 | 0.70 |
| 3-1 | 0.26 | ○ | ○ | ○ | ○ | ○ | ○ | ○ | ○ | ○ | ○ | ○ | ○ | ○ | ○ | ○ |
| 3-2 | 0.31 | ○ | ○ | ○ | ○ | ○ | ○ | ○ | ○ | ○ | ○ | ○ | ○ | ○ | ○ | ○ |
| 3-3 | 0.36 | ○ | ○ | ○ | ○ | ○ | ○ | ○ | ○ | ○ | ○ | ○ | ○ | ○ | ○ | Δ |
| 3-4 | 0.40 | ○ | ○ | ○ | ○ | ○ | ○ | ○ | ○ | ○ | ○ | ○ | Δ | Δ | Δ | Δ |
| 3-5 | 0.16 | ○ | ○ | ○ | ○ | ○ | ○ | ○ | ○ | ○ | ○ | ○ | ○ | ○ | ○ | ○ |
| 3-6 | 0.15 | ○ | ○ | ○ | ○ | ○ | ○ | ○ | ○ | ○ | ○ | ○ | ○ | ○ | ○ | ○ |
| 3-7 | 0.14 | ○ | ○ | ○ | ○ | ○ | ○ | ○ | ○ | ○ | ○ | ○ | ○ | ○ | ○ | ○ |
| 3-8 | 0.13 | ○ | ○ | ○ | ○ | ○ | ○ | ○ | ○ | ○ | ○ | ○ | ○ | ○ | ○ | ○ |
| 3-9 | 0.12 | ○ | ○ | ○ | ○ | ○ | ○ | ○ | ○ | ○ | ○ | ○ | ○ | ○ | ○ | ○ |
| 3-10 | 0.11 | ○ | ○ | ○ | ○ | ○ | ○ | ○ | ○ | ○ | ○ | ○ | ○ | ○ | ○ | ○ |

TABLE 14-continued

| No. | Maximum value of tan δ | Evaluation of sliding-contact property at each shaft eccentricity (mm TIR) | | | | | | | | | | | | | |
|---|---|---|---|---|---|---|---|---|---|---|---|---|---|---|---|
| | | 0.00 | 0.05 | 0.10 | 0.15 | 0.20 | 0.25 | 0.30 | 0.35 | 0.40 | 0.45 | 0.50 | 0.55 | 0.60 | 0.65 | 0.70 |
| 3-11 | 0.08 | ○ | ○ | ○ | ○ | ○ | ○ | ○ | ○ | ○ | ○ | ○ | ○ | ○ | ○ | ○ |
| 3-12 | 0.14 | ○ | ○ | ○ | ○ | ○ | ○ | ○ | ○ | ○ | ○ | ○ | ○ | ○ | ○ | ○ |

TABLE 15

| No. | Temperature of main lip (° C.) |
|---|---|
| 3-1 | 73 |
| 3-2 | 72 |
| 3-3 | 72 |
| 3-4 | 71 |
| 3-5 | 68 |
| 3-6 | 69 |
| 3-7 | 71 |
| 3-8 | 71 |
| 3-9 | 73 |
| 3-10 | 72 |
| 3-11 | 71 |
| 3-12 | 72 |

The results given in Table 14 show the following. In the case where the shaft eccentricity was 0.55 mm TIR or smaller, all the structures respectively equipped with seals Nos. 3-1 to 3-12 were satisfactory in the sliding-contact properties of the lips on the hub unit in the rotation test. Furthermore, the structures respectively equipped with seals Nos. 3-1, 3-2, and 3-5 to 3-12 (the seals in which the elastic body had a maximum value of loss tangent (tan δ) of from 0.08 to 0.31 in the temperature range of from 20 to 70° C.) had satisfactory lip sliding-contact properties on the hub unit in the rotation test even when the shaft eccentricity was 0.70 mm TIR.

In contrast, the structure equipped with seal No. 3-2 (the seal in which the elastic body had a maximum value of loss tangent (tan δ) of 0.36 in the temperature range of from 20 to 70° C.) had slightly poor lip sliding-contact properties on the hub unit in the rotation test when the shaft eccentricity was 0.70 mm TIR. Furthermore, the structure equipped with seal No. 3-3 (the seal in which the elastic body had a maximum value of loss tangent (tan δ) of 0.40 in the temperature range of from 20 to 70° C.) had slightly poor lip sliding-contact properties on the hub unit in the rotation test when the shaft eccentricity was 0.60 mm TIR or larger.

Those results indicate that the preferred range of the maximum value of loss tangent (tan δ) of the molded rubber (elastic body) constituting the lips, as determined in the temperature range of from 20 to 70° C., is from 0.08 to 0.31.

The results given in Table 15 further show that all the seals had a main-lip temperature of 73° C. or lower, which was a satisfactory value.

<Muddy-Water Durability Test>

Figure 6:
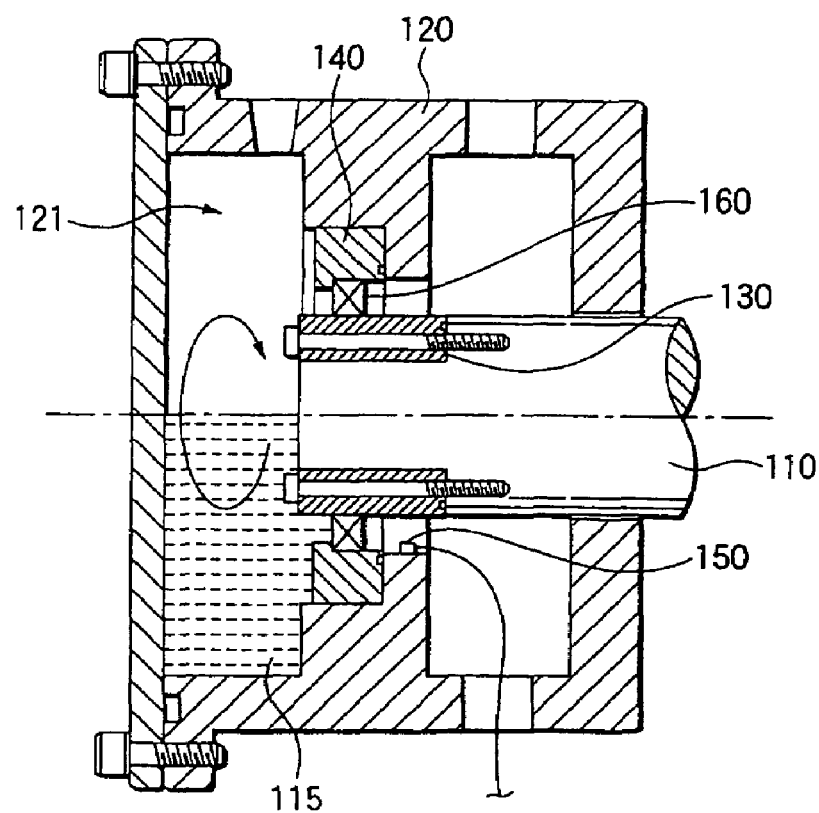
FIG. 6 is a diagrammatic view illustrating the constitution of the muddy-water durability tester used in an Embodiment.

Sealed hub units shown in FIG. 3 were subjected to a muddy-water durability test using a muddy-water durability tester shown in FIG. 6 manufactured by NSK Ltd.

This tester comprises a rotating shaft 110, a housing 120, a shaft-side ring member 130 fixed to the rotating shaft 110 with bolts, a housing-side ring member 140 fixed to the housing 120, a water leakage sensor 150, and a rotary drive (not shown). The housing 120 contains muddy water 115 in the space 121 located on the front side of the rotating shaft.

Attachment of a sealed hub unit 160 to this tester is accomplished by attaching the hub 61 of the unit to the shaft-side ring member 130, inserting this ring member 130 between the rotating shaft 110 and the housing-side ring member 140, and fixing the shaft-side ring member 130 to the rotating shaft 110 with bolts.

This test was made with respect to the seals 10 in which the elastic body 30 was each of moldings Nos. 1-1 to 1-4, produced in First Embodiment, moldings Nos. 2-1, 2-4, and 2-7 to 2-10, produced in Second Embodiment, and moldings Nos. 3-1 to 3-12, produced in Third Embodiment. These seals 10, in the sliding-contact property evaluation test, were rated as satisfactory (○) or slightly poor (Δ) when the shaft eccentricity was 0.70 mm TIR.

These seals 10 each was set in the tester shown in FIG. 6. The shaft eccentricity was regulated to 0.50 mm TIR and the hub unit was rotated under the following conditions to measure the time period required for the seal 10 to begin to leak water (muddy-water durability period). The grease applied to the sealed space between the hub unit 6 and the seal 10 was a mineral oil grease. The conditions for rotation included an ambient temperature of room temperature and a rotational speed of 1,000 rpm.

Subsequently, the muddy-water durability period obtained for each seal was converted to a relative value, with the value for seal No. 1-2 being taken as 1. The results obtained are shown in Table 16 below together with the maximum value of loss tangent (tan δ) of the elastic body 30 in each seal as determined in the temperature range of from 20 to 70° C.

TABLE 16

| No. | Maximum value of tan δ in 20–70° C. range | Muddy-water durability period (relative value) |
|---|---|---|
| 1-1 | 0.22 | 1.4 |
| 1-2 | 0.40 | 1.0 |
| 1-3 | 0.26 | 1.4 |
| 1-4 | 0.19 | 1.5 |
| 2-1 | 0.15 | 2.5 |
| 2-4 | 0.17 | 1.9 |
| 2-7 | 0.11 | 3.0 |
| 2-8 | 0.13 | 2.8 |
| 2-9 | 0.18 | 1.6 |
| 2-10 | 0.26 | 1.3 |
| 3-1 | 0.26 | 1.4 |
| 3-2 | 0.31 | 1.3 |
| 3-3 | 0.36 | 1.1 |
| 3-4 | 0.40 | 1.0 |
| 3-5 | 0.16 | 2.1 |
| 3-6 | 0.15 | 2.8 |
| 3-7 | 0.14 | 3.0 |
| 3-8 | 0.13 | 2.9 |
| 3-9 | 0.12 | 3.0 |
| 3-10 | 0.11 | 3.1 |
| 3-11 | 0.08 | 3.0 |
| 3-12 | 0.14 | 2.9 |

Figure 7:
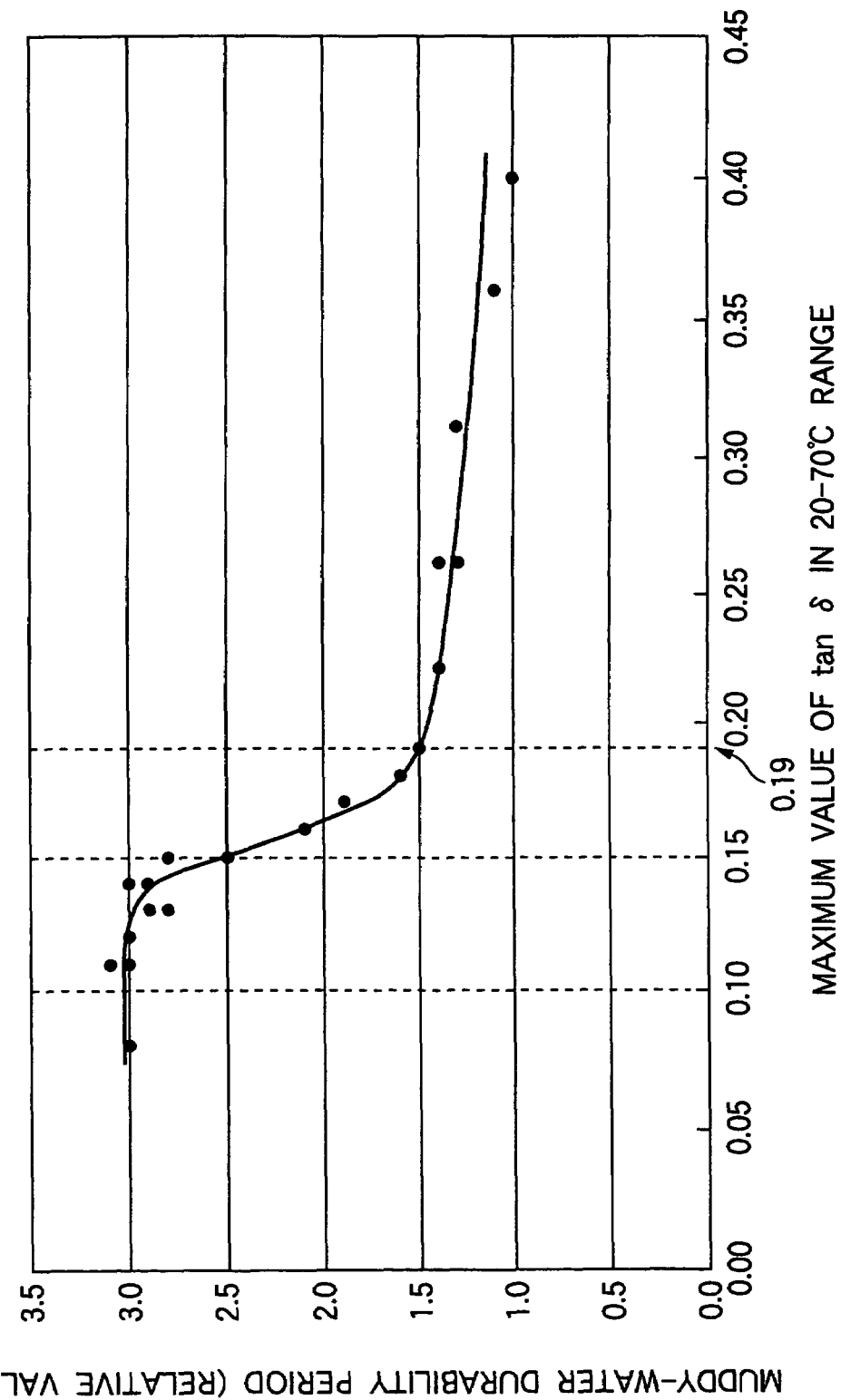
FIG. 7 is a graph showing the relationship between the maximum value of tan δ of the elastic body in seals obtained in the Embodiments as determined in the ambient temperature range of from 20 to 70° C. and the muddy-water durability period (relative value).

A graph showing the relationship between the maximum value of tan δ of the elastic body 30 in the seals as determined in the ambient temperature range of from 20 to 70° C. and the muddy-water durability period (relative value) is shown in FIG. 7. This relationship was obtained from the results given in Table 16.

The graph shows that the smaller the maximum value of tan δ in that temperature range, the longer the muddy-water durability period. In particular, the muddy-water durability period abruptly becomes longer as the maximum value of tan δ in that temperature range decreases to and below 0.19, and becomes constant as that maximum value decreases to around 0.10. Namely, by using a molded rubber having a maximum value of tan δ of 0.19 or smaller (or from 0.08 to 0.19, or from 0.10 to 0.19) in the ambient temperature range of from 20 to 70° C., a seal having especially high muddy-water durability (sealing performance) can be obtained. The graph shows that the especially preferred range of the maximum value of tan δ in that temperature range, from the standpoint of the muddy-water durability (sealing performance) of the seal, is up to 0.15 (or from 0.08 to 0.15, or from 0.10 to 0.15).

Figure 8:
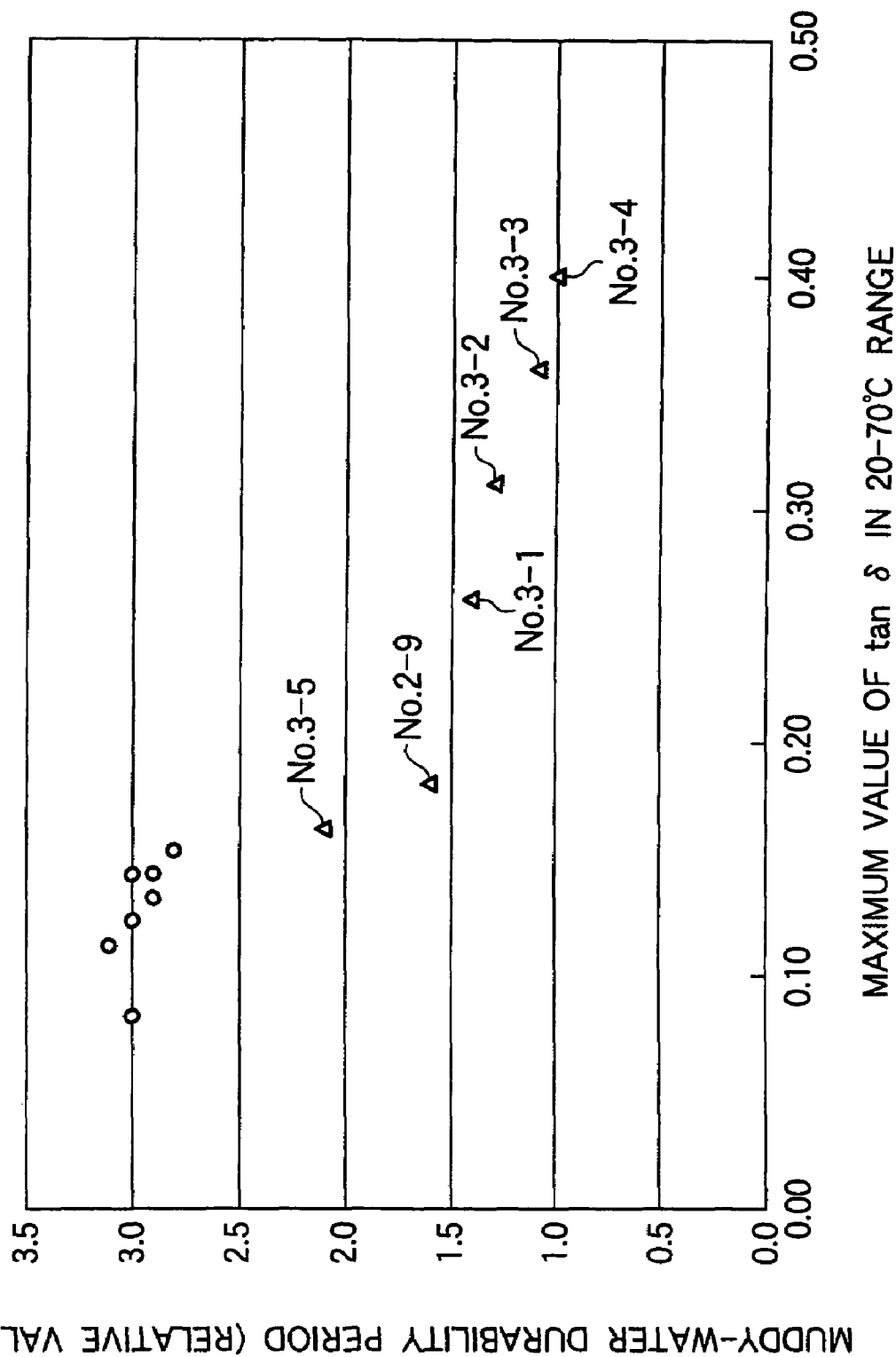
FIG. 8 is a graph showing the relationship between the maximum value of tan δ of the elastic body in the seal samples obtained with raw rubber G in Embodiments as determined in the ambient temperature range of from 20 to 70° C. and the muddy-water durability period.

Of the results given in Table 16, those for the samples obtained with raw rubber G are graphically shown in FIG. 8. This graph also shows the relationship between the maximum value of tan δ of the elastic body 30 in the seals as determined in the ambient temperature range of from 20 to 70° C. and the muddy-water durability period (relative value).

In this graph, the circle symbols are plots for the samples (Nos. 3-6 to 3-12) each containing a carbon black and a clay as two reinforcing fillers, while the triangle symbols are plots for the samples (Nos. 2-9 and 3-1 to 3-5) each containing one of a carbon black, clay, talc, and wollastonite as the reinforcing filler.

The graph shows the following. The elastic bodies 30 in the samples containing a mixture of a carbon black and a white filler (e.g., clay, talc, or wollastonite) as reinforcing fillers can have a smaller maximum value of tan δ in the ambient temperature range of from 20 to 70° C. than those in the samples containing only one of these fillers. As a result, the seals containing the two kinds of fillers can have especially high muddy-water durability (sealing performance).

As stated above, the contents of the reinforcing fillers are generally such that the amounts of a carbon black and a white reinforcement are from 10 to 90 parts by weight and from 10 to 110 parts by weight, respectively, and the total amount of these is from 20 to 200 parts by weight, per 100 parts by weight of the raw rubber. Preferably, however, the amounts of the carbon black and white reinforcement are from 20 to 90 parts by weight and from 20 to 100 parts by weight, respectively, and the total amount of these is from 50 to 150 parts by weight per 100 parts by weight of the raw rubber. It is also preferred that the proportion of the carbon black in all reinforcing fillers be from 0.31 to 0.75.

Although the embodiments described above are seals for rolling bearings and hub units, the seal of the invention is suitable for use in other rolling apparatuses (e.g., hub unit bearings, linear guides, and ball screws).

EXAMPLES OF HUB UNIT BEARINGS

Figure 9:
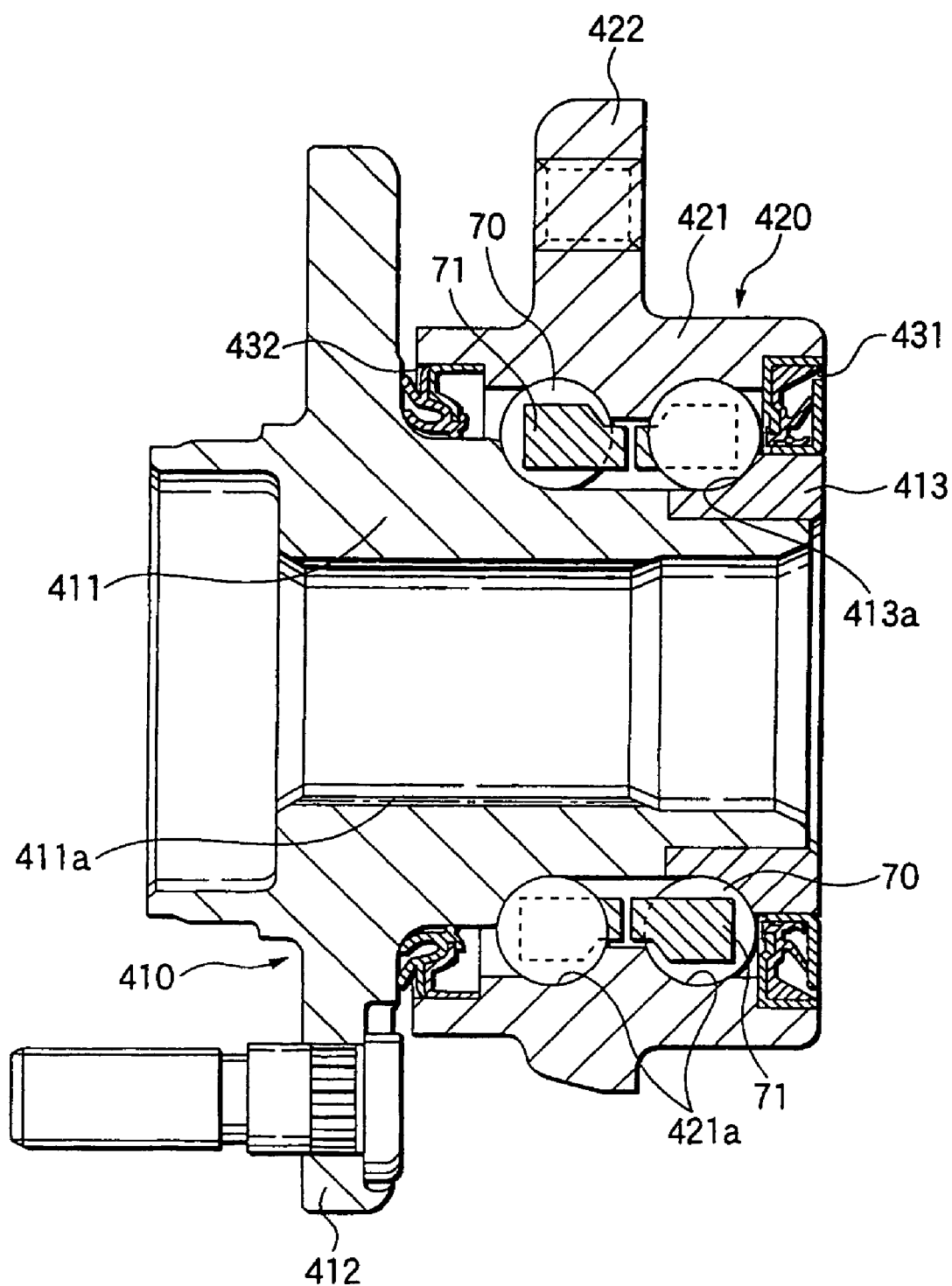
FIG. 9 is a sectional view illustrating an example of automotive hub unit bearings.

An example of automotive hub unit bearings is shown in FIG. 9.

This automotive hub unit bearing comprises an inner ring member 410, an outer ring member 420, balls 70, cages 71, and seals 431 and 432. The inner ring member 410 is constituted of a hub 411 in which a shaft is to be disposed, a flange 412 united with the hub at one shaft-direction end of the outer periphery thereof, and a raceway member 413 attached to the other end. Symbol 411a indicates a spline groove for shaft attachment. The outer circumferential surface of the hub 411 and the outer circumferential surface of the raceway member 413 respectively have inner-ring raceways 411a and 413a.

The outer ring member 420 is constituted of a nearly cylindrical outer ring 421 and a flange 422 united with the outer circumferential surface thereof. It has an outer raceway 421a, which corresponds to the inner-ring raceways 411a and 413a.

This hub unit bearing is of the inner-ring rotation type. A shaft (driving shaft) is inserted into the inner ring member 410 along the spline grooves 411a. A wheel is attached to the flange 412 of the inner ring member 410, and a suspension system is attached to the flange 422 of the outer ring member 420.

In this hub unit bearing, the space between the inner ring member 410 and the outer ring member 420 is sealed with seals 431 and 432 at both shaft-direction ends of the outer ring member 420. The seal 432 disposed on the side facing the flange 412 of the inner ring member 410, for example, has the structure shown in FIG. 5, while the other seal 431, for example, has the structure shown in FIG. 3.

EXAMPLES OF SEAL SHAPE

The seal of the invention is one in which the molded rubber constituting the lips has a specific maximum value of loss tangent (tan δ) in a given temperature range, and is not particularly limited in seal shape. However, preferred seal shapes will be explained below.

Figure 10:
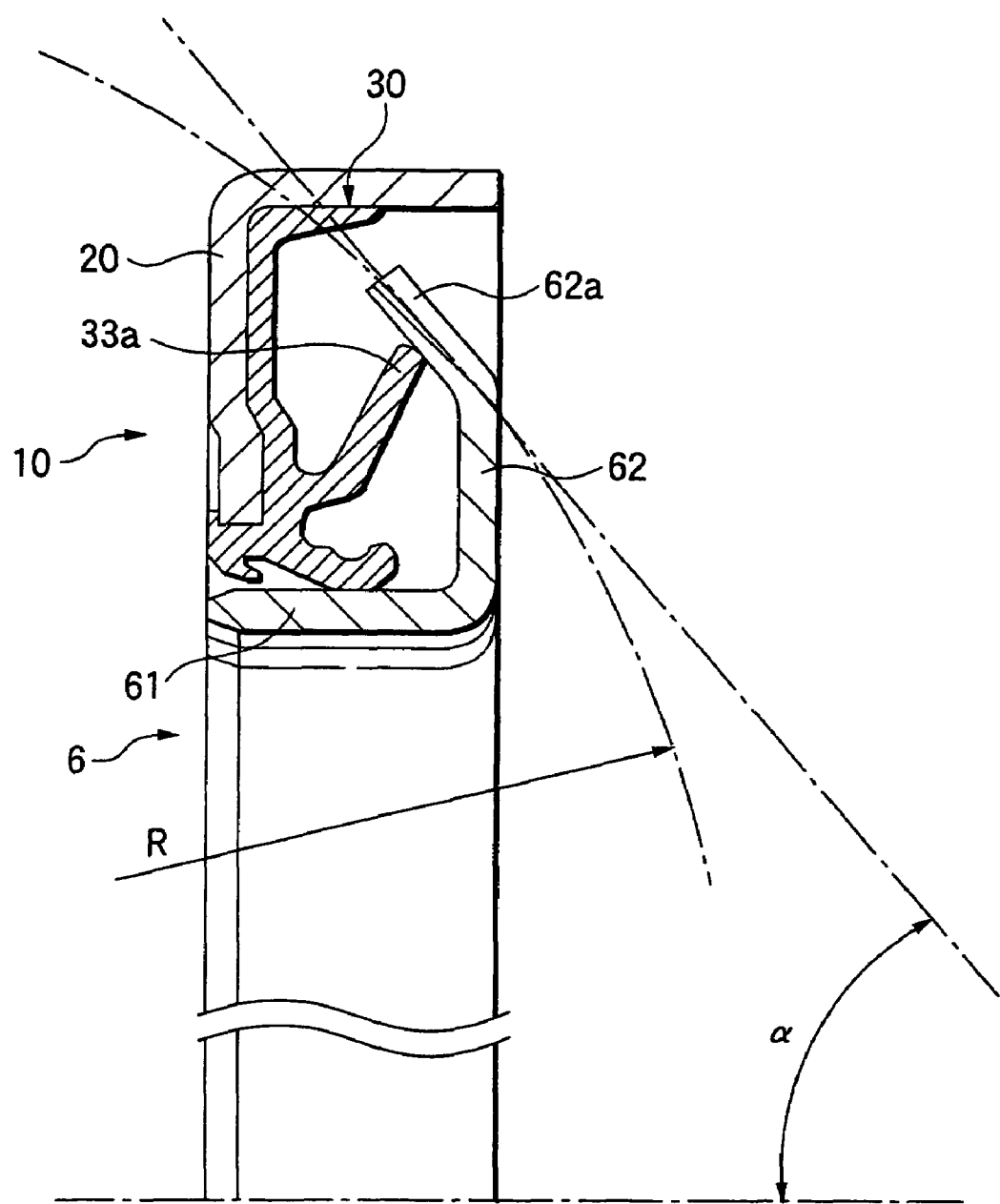
FIG. 10 is a sectional view illustrating an example of seal structures.

FIG. 10 shows a modification of the sealed hub unit shown in FIG. 3. This unit has a flange 62 having a bent part 62a along the outer edge thereof, and a lip 33a is in sliding contact with this bent part 62a. Thus, the sliding contact surface is in a spherical surface having a radius of R and having the same center as the hub unit, or is in a circular conical surface in contact with the spherical surface. By thus forming a sliding contact surface in a spherical surface having a radius of R and having the same center as the hub unit or in a circular conical surface in contact with the spherical surface, the following effects are obtained.

In the case where the seal shown in FIG. 10 is used as the seal 431 in the hub unit bearing shown in FIG. 9, the "exposed thread" at the time when the inner ring and the outer ring are in a coaxial state can be reduced due to the use of the seal. The reason for this is that the seal shown in FIG. 10 is reduced in "exposed thread" change. Because of this, water leakage can be prevented even when the inner ring is inclined relative to the outer ring, for example, due to a momental load imposed on the hub unit bearing. Consequently, an improvement in sealing property and a reduction in torque can be simultaneously attained in the structure shown in FIG. 10.

Figure 11A:
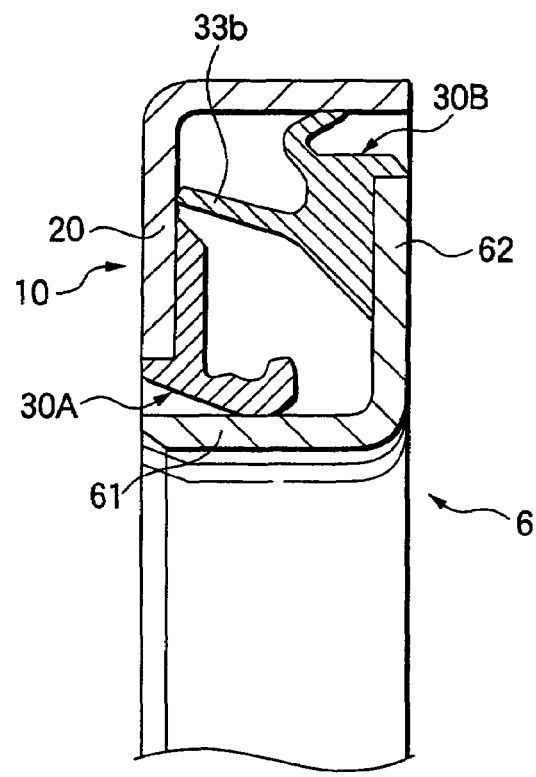
FIGS. 11A and 11B are sectional views illustrating other examples of seal structures.
Figure 11B:
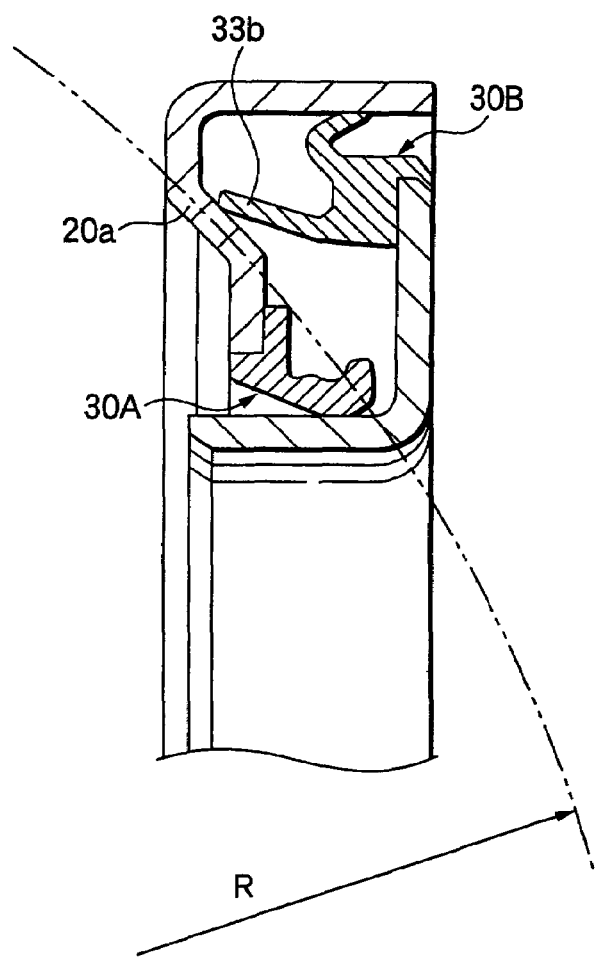

In FIGS. 11A and 11B are shown seals each having two elastic bodies 30A and 30B. Like the bearing shown in FIG. 10, the structure shown in FIG. 11B has a sliding contact surface in a spherical surface having a radius of R and having the same center as the hub unit. The core metal 20 hence has a bent part 20a. The seal shown in FIG. 11B produces the same effects as the seal shown in FIG. 10.

Figure 12:
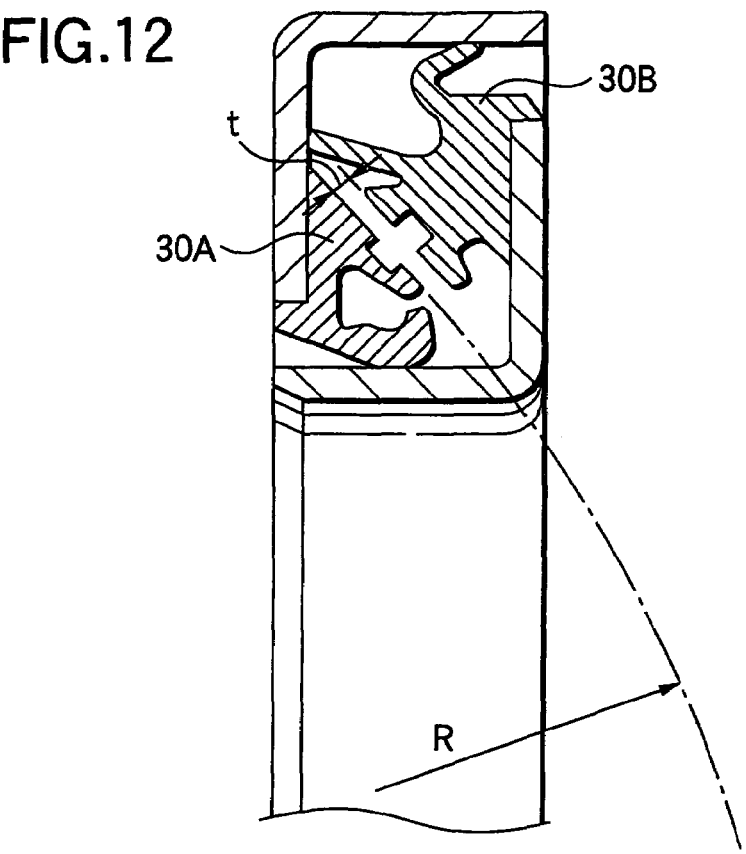
FIG. 12 is a sectional view illustrating a further example of seal structures.

FIG. 12 shows a seal which has the same shape as the seal shown in FIG. 11B except that it has a labyrinth space t between the elastic bodies 30A and 30B. Due to the sealing effect of the labyrinth, the sealing properties are further improved. Moreover, the effect of reducing torque is obtained because the "exposed thread" for the lips can be reduced while maintaining the same sealing properties.

Figure 5:
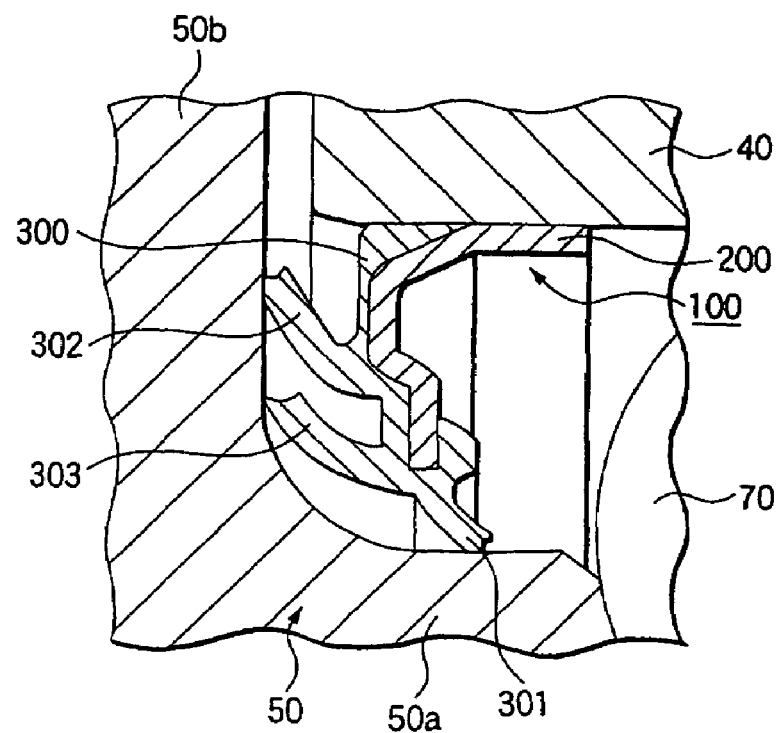
FIG. 5 is a sectional view illustrating another example of sealed hub units.
Figure 13:
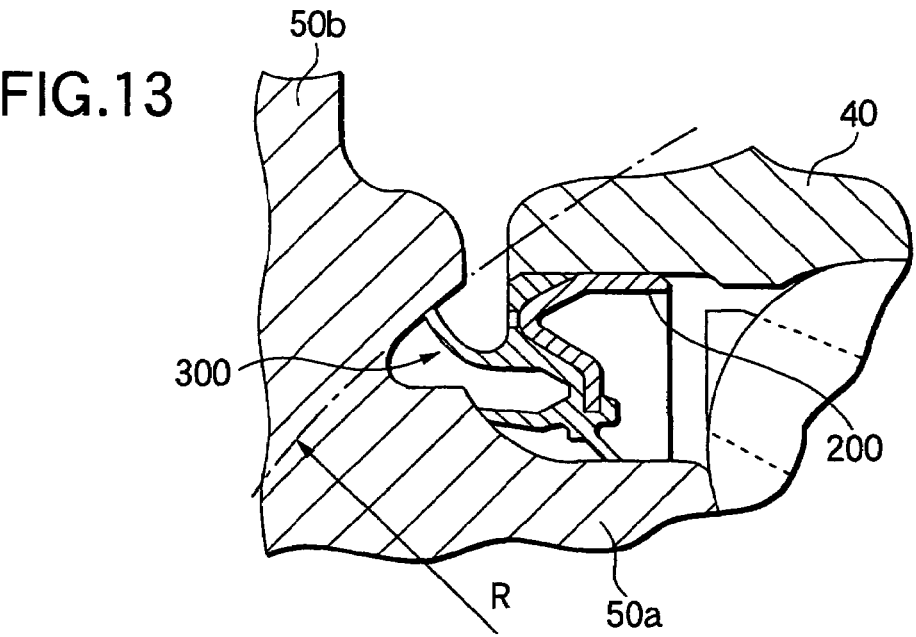
FIG. 13 is a sectional view illustrating still a further example of seal structures.
Figure 14:
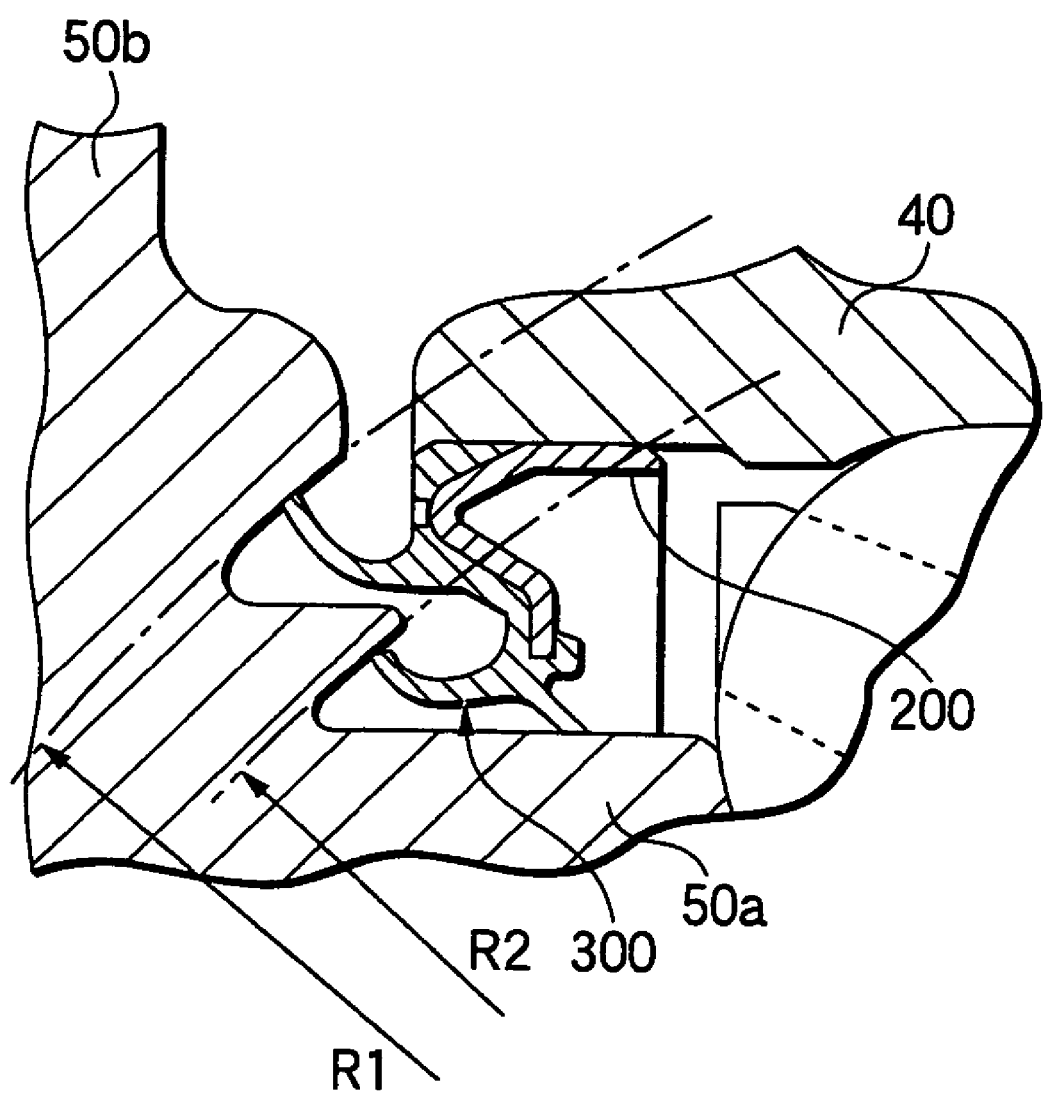
FIG. 14 is a sectional view illustrating still a further example of seal structures.

FIGS. 13 and 14 show modifications of the seal shown in FIG. 5. As in the case of the bearing shown in FIG. 10, the structures including these seals have one or more sliding contact surfaces each in a spherical surface having a radius of R, R1 or R2 and having the same center as the hub unit. Because of this, these seals produce the same effects as the seal shown in FIG. 10.

Figure 15A:
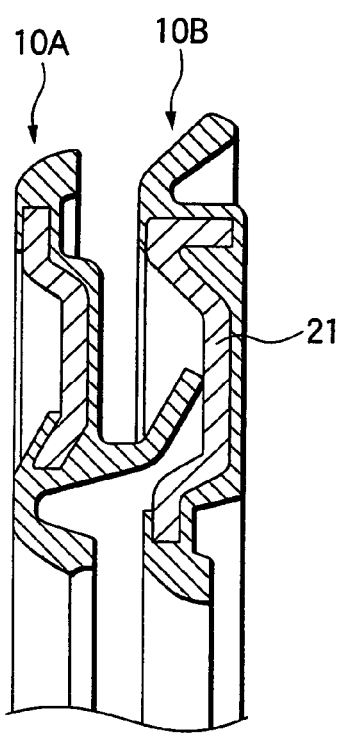
FIGS. 15A and 15B are sectional views illustrating still further examples of seal structures.
Figure 15B:
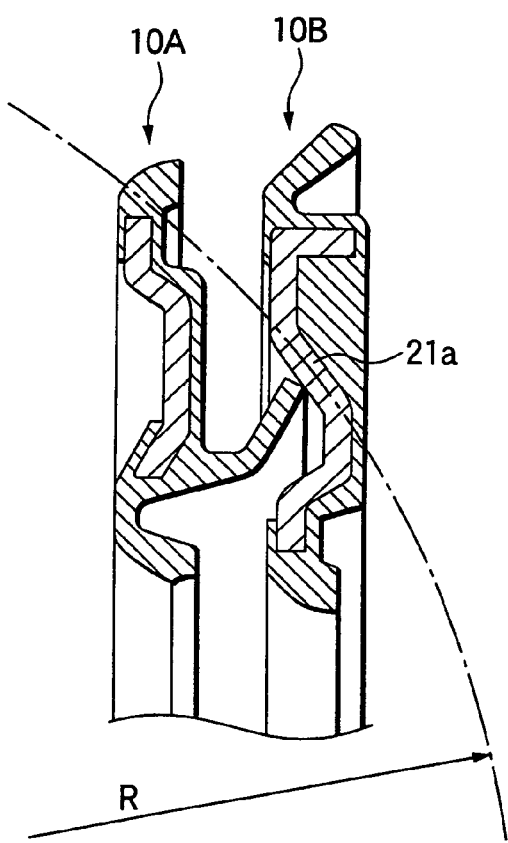

FIGS. 15A and 15B show seal structures comprising two seals 10A and 10B. Like the bearing shown in FIG. 10, the structure shown in FIG. 15B has a sliding contact surface in a spherical surface having a radius of R and having the same center as the hub unit. The core metal 21 hence has a bent part 21a. The seal shown in FIG. 15B produces the same effects as the seal shown in FIG. 10.

Figure 16:
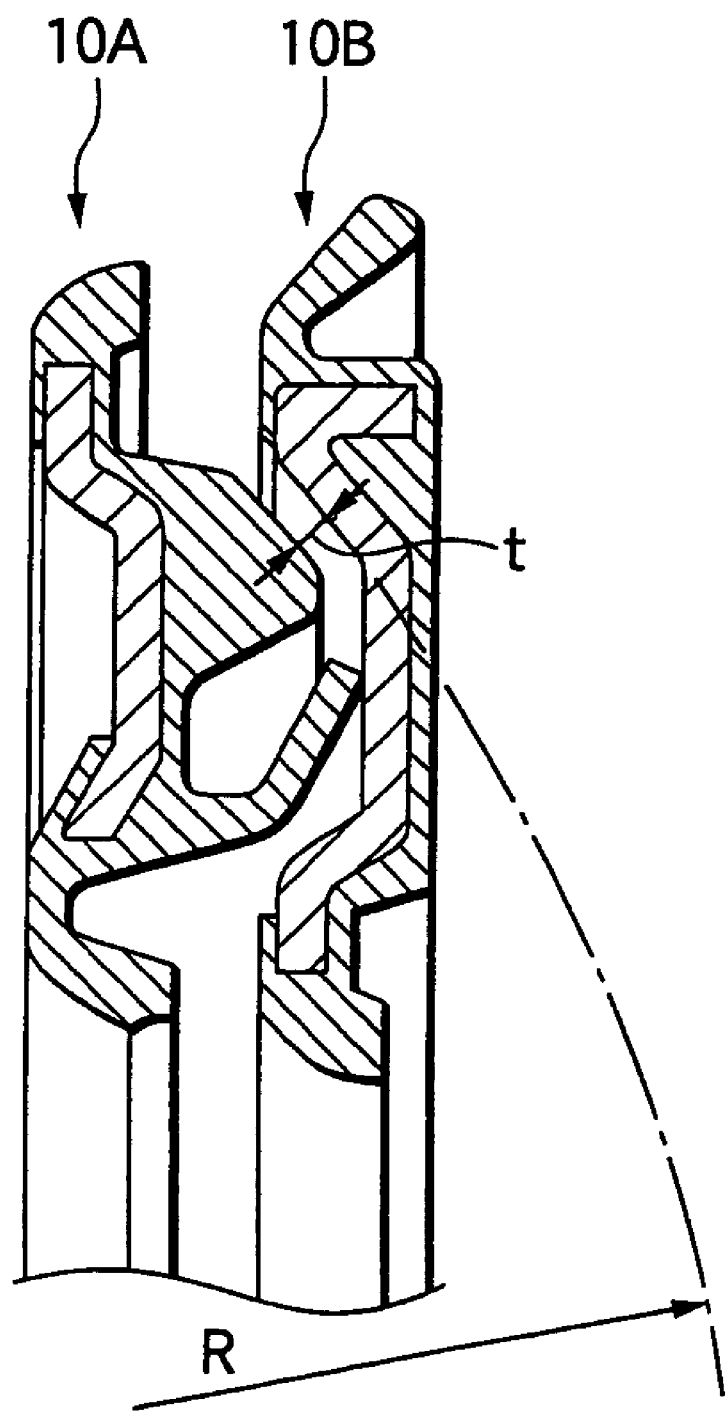
FIG. 16 is a sectional view illustrating still a further example of seal structures.

FIG. 16 shows a seal structure which has the same shape as the seal structure shown in FIG. 15B except that it has a labyrinth space t between the two seals 10A and 10B. Due to the sealing effect of the labyrinth, the sealing properties are further improved. Moreover, the effect of reducing torque is obtained because the "exposed thread" for the lips can be reduced while maintaining the same sealing properties.

As described above, a seal which, when used in a rolling apparatus such as, e.g., a rolling bearing, automotive hub unit, hub unit bearing, linear guide, or ball screw, has high lip sliding-contact properties on the seal contact surface can be obtained according to the invention by using, as the material of the seal lip(s), a molded rubber having a maximum value of loss tangent (tan $\delta$) of 0.50 or smaller in the temperature range of from 10 to 120° C. (or having a maximum value of loss tangent (tan $\delta$) of 0.40 or smaller in the temperature range of from 20 to 70° C.).

Namely, since this seal has excellent lip sliding-contact properties on the seal contact surface, it retains high sealing properties even in a severe environment in which water and dust are present in large amounts. The seal hence prevents the grease from leaking out and water or dust particles from coming into the sealed area.

Therefore, by attaching the seal of the invention to a rolling apparatus to be used in a severe environment in which water and dust are present in large amounts, the life of this rolling apparatus can be prolonged.

While the invention has been described in detail and with reference to specific embodiments thereof, it will be apparent to one skilled in the art that various changes and modifications can be made therein without departing from the spirit and scope thereof.

What is claimed is:

1. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of not less than 26% by weight and less than 36% by weight and, as a reinforcing filler, a carbon black in an amount of from 20 to 90 parts by weight per 100 parts by weight of the raw rubber, and
wherein said molded rubber has a maximum value of loss tangent of 0.08 to 0.19 in a temperature range of from 20 to 70° C.

2. The hub unit as claimed in claim 1, wherein said inner ring (50) has a receiving groove (51) formed in an outer circumferential surface of the inner ring (50), and said lips (302, 303) is in sliding contact with said receiving groove (51).

3. The hub unit as claimed in claim 1, wherein said one or more lips have a hardness of from 70 to 80.

4. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of not less than 26% by weight and less than 36% by weight,
wherein the molded rubber comprises a raw rubber, and as a reinforcing filler, a mixture of a carbon black and a white reinforcement, the amounts of the carbon black and white reinforcement being from 20 to 100 parts by weight and from 20 to 100 parts by weight, respectively, and the total amount of the two reinforcing ingredients contained being from 50 to 150 parts by weight, per 100 parts by weight of the raw rubber, and
wherein said molded rubber has a maximum value of loss tangent of 0.08 to 0.19 in a temperature range of from 20 to 70° C.

5. The hub unit as claimed in claim 4, wherein the proportion of carbon black in the reinforcing filler is from 0.31 to 0.75.

6. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of from 26 to 35% by weight, and
wherein said molded rubber has a maximum value of loss tangent of 0.08 to 0.19 in a temperature range of from 20 to 70° C.

7. The hub unit as claimed in claim 6, wherein the molded rubber comprises a raw rubber, and as a reinforcing filler, a mixture of a carbon black and a white reinforcement, the amounts of the carbon black and white reinforcement being from 20 to 100 parts by weight and from 20 to 100 parts by weight, respectively, and the total amount of the two reinforcing ingredients contained being from 50 to 150 parts by weight, per 100 parts by weight of the raw rubber.

8. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of from 26 to 33.5% by weight, and wherein said molded rubber has a maximum value of loss tangent of 0.08 to 0.19 in a temperature range of from 20 to 70° C.

9. The hub unit as claimed in claim 8, wherein the molded rubber comprises a raw rubber, and as a reinforcing filler, a mixture of a carbon black and a white reinforcement, the amounts of the carbon black and white reinforcement being from 20 to 100 parts by weight and from 20 to 100 parts by weight, respectively, and the total amount of the two reinforcing ingredients contained being from 50 to 150 parts by weight, per 100 parts by weight of the raw rubber.

10. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of not less than 26% by weight and less than 36% by weight, wherein said inner ring (50) has a receiving groove (51) formed in an outer circumferential surface of the inner ring (50), and one of said lips (302, 303) is in sliding contact with said receiving groove (51), wherein the molded rubber comprises a raw rubber and, as a reinforcing filler, a carbon black in an amount of from 20 to 90 parts by weight per 100 parts by weight of the raw rubber, wherein the molded rubber comprises a raw rubber and, as a reinforcing filler, a white reinforcement in an amount of from 20 to 150 parts by weight per 100 parts by weight of the raw rubber, and wherein said molded rubber has a maximum value of loss tangent of 0.08 to 0.19 in a temperature range of from 20 to 70° C.

11. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of not less than 26% by weight and less than 36% by weight, wherein the molded rubber comprises a raw rubber, and as a reinforcing filler, a mixture of a carbon black and a white reinforcement, the amounts of the carbon black and white reinforcement being from 20 to 100 parts by weight and from 20 to 100 parts by weight, respectively, and the total amount of the two reinforcing ingredients contained being from 50 to 150 parts by weight, per 100 parts by weight of the raw rubber, wherein the proportion of carbon black in the reinforcing filler is from 0.31 to 0.75, and wherein said molded rubber has a maximum value of loss tangent of 0.08 to 0.19 in a temperature range of from 20 to 70° C.

12. A hub unit comprising a hub (50a) and a flange (50b) integrally formed with the hub (50a), an inner ring (50) having a raceway surface for receiving rolling elements (70), an outer ring (40), and a seal (100) sealing the space between the inner ring (50) and the outer ring (40), said seal (100) comprising a core metal (200) and an elastic body (300) integrally molded with the core metal (200), said elastic body (300) including a radial lip (301) in sliding contact with an outer circumferential surface of the hub (50a) and one or more lips (302, 303) in sliding contact with flange (50b), and said elastic body comprising a molded rubber, wherein the molded rubber comprises, as a raw rubber, acrylonitrile/butadiene rubber having an acrylonitrile monomer content of from 26 to 33.5% by weight, wherein the molded rubber comprises a raw rubber, and as a reinforcing filler, a mixture of a carbon black and a white reinforcement, the amounts of the carbon black and white reinforcement being from 20 to 100 parts by weight and from 20 to 100 parts by weight, respectively, and the total amount of the two reinforcing ingredients contained being from 50 to 150 parts by weight, per 100 parts by weight of the raw rubber, and wherein said molded rubber has a maximum value of loss tangent of 0.08 to 0.19 in a temperature range of from 20 to 70° C.

* * * * *